United States Patent
Mata et al.

(10) Patent No.: US 7,463,939 B1
(45) Date of Patent: Dec. 9, 2008

(54) SCHEDULING TOOLS WITH QUEUE TIME CONSTRAINTS

(75) Inventors: Gustavo Mata, Austin, TX (US); Steven C. Nettles, Johnson City, TX (US); Larry D. Barto, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 786 days.

(21) Appl. No.: 10/991,808

(22) Filed: Nov. 18, 2004

(51) Int. Cl.
*G06F 19/00* (2006.01)
(52) U.S. Cl. .................................. 700/100; 700/103
(58) Field of Classification Search ............ 700/100, 700/103
See application file for complete search history.

(56) References Cited

U.S. PATENT DOCUMENTS

| | | | |
|---|---|---|---|
| 4,796,194 A | 1/1989 | Atherton | 364/468 |
| 5,093,794 A | 3/1992 | Howie et al. | 364/468 |
| 5,369,570 A | 11/1994 | Parad | 364/401 |
| 5,375,061 A | 12/1994 | Hara et al. | 364/468 |
| 5,444,632 A | 8/1995 | Kline et al. | 364/468 |
| 5,446,671 A | 8/1995 | Weaver et al. | 364/468 |
| 5,548,535 A | 8/1996 | Zvonar | 364/551.01 |
| 5,586,021 A | 12/1996 | Fargher et al. | 364/468.06 |
| 5,835,688 A | 11/1998 | Fromherz | 395/112 |
| 5,890,134 A | 3/1999 | Fox | 705/9 |
| 5,953,229 A | 9/1999 | Clark et al. | 364/468.06 |
| 6,038,539 A | 3/2000 | Maruyama et al. | 705/8 |
| 6,088,626 A | 7/2000 | Lilly et al. | 700/100 |
| 6,091,998 A | 7/2000 | Vasko et al. | 700/100 |
| 6,128,542 A | 10/2000 | Kristoff et al. | 700/97 |
| 6,148,239 A | 11/2000 | Funk et al. | 700/1 |
| 6,202,062 B1 | 3/2001 | Cameron et al. | 707/3 |
| 6,263,255 B1 | 7/2001 | Tan et al. | 700/121 |
| 6,356,797 B1 | 3/2002 | Hsieh et al. | 700/101 |
| 6,374,144 B1 | 4/2002 | Viviani et al. | 700/12 |
| 6,400,999 B1 | 6/2002 | Kashiyama et al. | 700/100 |
| 6,434,443 B1 | 8/2002 | Lin | 700/100 |
| 6,584,369 B2 | 6/2003 | Patel et al. | 700/100 |
| 6,647,307 B1 * | 11/2003 | Huang et al. | 700/102 |
| 2003/0225474 A1 * | 12/2003 | Mata et al. | 700/121 |

FOREIGN PATENT DOCUMENTS

WO  WO 03/102841  * 12/2003

OTHER PUBLICATIONS

Wang, Yi-Chi, and Usher, John M. "An Agent-Based Approach for Flexible Routing in Dynamic Job Shop Scheduling". Proc. Of Industrial Engineering Research Conference (2002).*

(Continued)

*Primary Examiner*—Ryan A Jarrett
(74) *Attorney, Agent, or Firm*—Williams, Morgan & Amerson, P.C.

(57) ABSTRACT

A method and apparatus for use in an automated manufacturing environment are disclosed. The method includes autonomously scheduling a consumer manufacturing domain entity for the consumption of services provided by a plurality of provider manufacturing domain entities in an automated process flow; and constraining the autonomous scheduling to lessen queue time violations in the process flow. The apparatus includes a program storage medium encoded with instructions that, when executed by a computing device, performs such a method; a computing apparatus programmed to perform such a method, and an automated process flow implementing such a method.

40 Claims, 8 Drawing Sheets

```
AUTONOMOUSLY SCHEDULE A CONSUMER MANUFACTURING
DOMAIN ENTITY FOR THE CONSUMPTION OF SERVICES         — 203
PROVIDED BY A PLURALITY OF PROVIDER MANUFACTURING
DOMAIN ENTITIES IN AN AUTOMATED PROCESS FLOW
```

```
CONSTRAIN THE AUTONOMOUS SCHEDULING TO LESSEN   — 209
QUEUE TIME VIOLATIONS IN THE PROCESS FLOW
```

OTHER PUBLICATIONS

U.S. Appl. No. 10/331,715, filed Dec. 30, 2002, Nettles et al.
U.S. Appl. No. 10/331,598, filed Dec. 30, 2002, Barto et al.
U.S. Appl. No. 10/331,596, filed Dec. 30, 2002, Barto et al.
U.S. Appl. No. 10/284,705, filed Oct. 31, 2002, Nettles et al.
U.S. Appl. No. 10/233,197, filed Aug. 30, 2002, Barto et al.
U.S. Appl. No. 10/232,145, filed Aug. 30, 2002, Barto et al.
U.S. Appl. No. 10/231,930, filed Aug. 30, 2002, Barto et al.
U.S. Appl. No. 10/231,888, filed Aug. 30, 2002, Barto et al.
U.S. Appl. No. 10/231,849, filed Aug. 30, 2002, Barto et al.
U.S. Appl. No. 10/231,648, filed Aug. 30, 2002, Barto et al.
U.S. Appl. No. 10/231,561, filed Aug. 30, 2002, Barto et al.
U.S. Appl. No. 10/190,194, filed Jul. 3, 2002, Li et al.
U.S. Appl. No. 10/160,990, filed May. 31, 2002, Mata et al.
U.S. Appl. No. 10/160,956, filed May. 31, 2002, Li et al.
U.S. Appl. No. 10/135,145, filed Apr. 30, 2002, Mata et al.
International Search Report Dated Sep. 30, 2003 (PCT/US02/41777).
International Search Report Dated Feb. 16, 2004 (PCT/US02/41659).
Resende,"Shop Floor Scheduling of Semiconductor Wafer Manufacturing," *University of California, Berkeley* (1987).
Glassey et al., "Closed-Loop Job Release Control for VLSI Circuit Manufacturing," *IEEE Transactions on Semiconductor Manufacturing* 1:36-46 (1988).
"Agent-Enhanced Manufacturing System Initiative," *Technologies for the Integration of Manufacturing Applications (TIMA)* (Oct. 1997).
"Factory Integration," *The National Technology Roadmap for Semiconductors: Technology Needs* (1997).
SALSA Enhancements for next Swarm Release (Apr. 22, 1999).
SALSA Exceptions—Minutes from May 11, 1999.
Starvation Avoidance Lot Start Agent (SALSA) (Overview: Apr. 15, 1999).
Starvation Avoidance Lot Start Agent, *Fab25 AEMSI/SALSA Review Meeting* (May 26, 1999).
Starvation Avoidance Lot Start Agent, *Iteration 1 Requirements Kickoff* (May 3, 1999).
Van Parunak, "Review of Axtell and Epstein" (Jun. 23, 1999).
Baumgärtel et al., "Combining Multi-Agent Systems and Constraint Techniques in Production Logistics" (1996).
Bonvik et al., "Improving a Kanban Controlled Production Line Through Rapid Information Dissemination" (Jul. 10, 1995).
Hynynen, "BOSS: An Artificially Intelligent System for Distributed Factory Scheduling," *Computer Applications in Production and Engineering*, pp. 667-677 (1989).
Li et al., "Minimum Inventory Variability Schedule with Applications in Semiconductor Fabrication," *IEEE Transactions on Semiconductor Manufacturing* 9:145-149 (1996).
Lin et al., "Integrated Shop Floor Control Using Autonomous Agents," *IIE Transactions* 24:57-71 (1992).
Lu et al., "Efficient Scheduling Policies to Reduce Mean and Variance of Cycle-Time in Semiconductor Manufacturing Plants," *IEEE Transactions Semiconductor Manufacturing* 7:374-388 (1994).
Martin-Vega et al., "Applying Just-In-Time in a Wafer Fab: A Case Study," *IEEE Transactions on Semiconductor Manufacturing* 2:16-22 (1989).
Van Parunak et al., "Agents Do It In Time—Experiences with Agent-Based Manufacturing Scheduling" (1999).
Hollister, "Schedule Paper #17 Summary" (Jun. 23, 1999).
Hollister, "Schedule Paper #19 Summary" (Jun. 23, 1999).
Hollister, "Schedule Paper #23 Summary" (Jun. 23, 1999).
Hollister, "Schedule Paper #32 Summary" (Jun. 23, 1999).
Vaario et al., "An Emergent Modelling Method for Dynamic Scheduling," *Journal of Intelligent Manufacturing* 9:129-140 (1998).
Wellman et al., "Auction Protocols for Decentralized Scheduling" (May 22, 1998).
Weber, "Material Traceability—The Missing Link in TAP Systems," *Test, Assembly and Packaging Automation and Integration '99 Conference* (1999).
"ObjectSpace Fab Solutions Semiconductor Product Development Overview" (presented at SEMICON Southwest 1998).
"Agent Enhanced Manufacturing Systems Initiative (AEMSI) Project" (presented by Dan Radin, ERIM CEC Nov. 12-13, 1998).
Weber, "APC Framework: Raising the Standard for Fab Automation and Integration," *Equipment Automation Conference 1st European Symposium on Semiconductor Manufacturing* (Apr. 14, 1999).
Wein, "Scheduling Semiconductor Wafer Fabrication," *IEEE Transactions on Semiconductor Manufacturing* 1:115-130 (1988).
Bonvik, "Performance Analysis of Manufacturing Systems Under Hybrid Control Policies" (Sep. 22, 1995).
Bonvik, "Performance Analysis of Manufacturing Systems Under Hybrid Control Policies" (Oct. 3, 1995).
Sikora et al., "Coordination Mechanisms for Multi-Agent Manufacturing Systems: Applications to Integrated Manufacturing Scheduling," *IEEE Transactions on Engineering Management* 44:175-187 (1997).
Sousa et al., "A Dynamic Scheduling Holon for Manufacturing Orders," *Journal of Intelligent Manufacturing* 9:107-112 (1998).
Upton et al., "Architectures and Auctions in Manufacturing," *Int. J. Computer Integrated Manufacturing* 4:23-33 (1991).
Gere, "Heuristics in Job Shop Scheduling," *Management Science* 13:167-190 (1966).
Ehteshami et al., "Trade-Offs in Cycle Time Management: Hot Lots," *IEEE Transactions on Semiconductor Manufacturing* 5:101-106 (1992).
Axtell et al., "Distributed Computation on Economic Equilibria via Bilateral Exchange" (Mar. 1997).

\* cited by examiner

AUTONOMOUSLY SCHEDULE A CONSUMER MANUFACTURING DOMAIN ENTITY FOR THE CONSUMPTION OF SERVICES PROVIDED BY A PLURALITY OF PROVIDER MANUFACTURING DOMAIN ENTITIES IN AN AUTOMATED PROCESS FLOW — 203

CONSTRAIN THE AUTONOMOUS SCHEDULING TO LESSEN QUEUE TIME VIOLATIONS IN THE PROCESS FLOW — 209

SCHEDULING TOOLS WITH QUEUE TIME CONSTRAINTS

BACKGROUND OF THE INVENTION

1. Field of the Invention

This invention pertains to automated manufacturing environments, and, more particularly, to scheduling in an automated manufacturing environment employing agent-based scheduling and factory control.

2. Description of the Related Art

Growing technological requirements and the worldwide acceptance of sophisticated electronic devices have created an unprecedented demand for large-scale, complex, integrated circuits. Competition in the semiconductor industry requires that products be designed, manufactured, and marketed in the most efficient manner possible. This requires improvements in fabrication technology to keep pace with the rapid improvements in the electronics industry. Meeting these demands spawns many technological advances in materials and processing equipment and significantly increases the number of integrated circuit designs. These improvements also require effective utilization of computing resources and other highly sophisticated equipment to aid, not only design and fabrication, but also the scheduling, control, and automation of the manufacturing process.

Turning first to fabrication, integrated circuits, or microchips, are manufactured from modern semiconductor devices containing numerous structures or features, typically the size of a few micrometers. The fabrication process generally involves processing a number of wafers through a series of fabrication tools. Layers of materials are added to, removed from, and/or treated on a semiconducting substrate during fabrication to create the integrated circuits. The fabrication essentially comprises the following four basic operations: layering, or adding thin layers of various materials to a wafer from which a semiconductor is produced; patterning, or removing selected portions of added layers; doping, or placing specific amounts of dopants in selected portions of the wafer through openings in the added layers; and heat treating, or heating and cooling the materials to produce desired effects in the processed wafer.

Although there are only four basic operations, they can be combined in hundreds of different ways, depending upon the particular fabrication process. See, e.g., Peter Van 12ant, *Microchip Fabrication A Practical Guide to Semiconductor Processing* (3d Ed. 1997 McGraw-Hill Companies, Inc.) (ISBN 0-07-067250-4). Each fabrication tool performs one or more of four basic operations. The four basic operations are performed in accordance with an overall process to finally produce the finished semiconductor devices.

Controlling a semiconductor factory fabricating such integrated circuits, however, is a challenging task. A semiconductor factory ("fab") is a complex environment where numerous parts, typically 70,000 wafers or more, and numerous part types, typically 100 part types or more, are simultaneously being manufactured. As each wafer moves through the semiconductor factory (or, "fab"), it may undergo more than 300 processing steps, many of which use the same machines. A large factory may contain approximately 400 computer-controlled machines to perform this wafer processing. Routing, scheduling, and tracking material through the fab is a difficult and complicated task, even with the assistance of a computerized factory control system.

Efficient management of a facility for manufacturing products such as semiconductor chips requires monitoring various aspects of the manufacturing process. For example, it is typically desirable to track the amount of raw materials on hand, the status of work-in-process ("WIP") and the status and availability of machines and tools at every step in the process. One of the most important decisions is selecting which lot should run on each machine at any given time. Additionally, most machines used in the manufacturing process require scheduling of routine preventative maintenance ("PM") and equipment Qualification ("Qual") procedures, as well as other diagnostic and reconditioning procedures that must be performed on a regular basis. These procedures should be performed such that they do not impede the manufacturing process itself.

One approach to this issue implements an automated "Manufacturing Execution System" ("MES"). An automated MES enables a user to view and manipulate, to a limited extent, the status of machines and tools, or "entities," in a manufacturing environment. In addition, an MES permits dispatching and tracking of lots or work-in-process through the manufacturing process to enable resources to be managed in the most efficient manner. Specifically, in response to MES prompts, a user inputs requested information regarding work-in-process and entity status. For example, when a user performs a PM on a particular entity, the operator logs the performance of the PM (an "event") into an MES screen to update the information stored in the MES database with respect to the status of that entity. Alternatively, if an entity is to be put down for repair or maintenance, the operator will log this information into the MES database, which then prevents use of the entity until it is subsequently logged back up to a production ready state. Exemplary MESes include WORKSTREAM™, a product of Applied Materials, Inc., or SIVIEW™, a product of International Business Machines, Inc. ("IBM").

Although MES systems are sufficient for tracking lots and machines, such systems suffer several deficiencies, the most obvious of which are their passive nature, lack of advance scheduling and inability to support highly automated factory operations. Current MES systems largely depend on manufacturing personnel for monitoring factory state and initiating activities at the correct time. For example, a lot does not begin processing until a wafer fab technician ("WFT") issues the appropriate MES command. And, prior to processing, a WFT must issue an MES command to retrieve the lot from the automated material handling system ("AMHS") with sufficient advance planning that the lot is available at the machine when the machine becomes available. If the WFT does not retrieve the lot soon enough, or neglects to initiate processing at the earliest available time, the machine becomes idle and production is adversely impacted.

These types of deficiencies in the typical automated MES emphasize the importance of the WFT in the efficient operation of the manufacturing process. WFTs perform many vital functions. For instance, WFTs initiate dispatching, transport, and processing as their attention and time permits. They make scheduling decisions such as whether to run an incomplete batch, as opposed to waiting for additional approaching lots, or performing PM or Qualification procedures instead of processing lots. WFTs perform non-value added MES transactions and utilize conventional factory control systems that are passive. In this context, the term "passive" means activities in the control system must be initiated by the WFT, as opposed to being self-starting or self-initiating.

However, the presence of WFTs also inevitably introduces some inefficiencies. There typically is a large difference between the performance of the best WFT and the performance of the worst WFT. A WFT typically simultaneously monitors the processing of multiple tools and lots, making it difficult to focus on an individual lot or tool. Furthermore, the size and complexity of the modern fabrication process flows makes it exceedingly difficult for a WFT to foresee and prevent downstream bottlenecks or shortages arising from upstream activities. Shift changes, rest breaks, and days off for the WFT also create inefficiencies or machine idle time that adversely impact the manufacturing process flow. Just as the importance of the WFT is magnified by the deficiencies of the automated MES, so are the inefficiencies of the WFT magnified by his importance.

Thus, factory control systems utilized in today's wafer fabs are passive and do not enable a high degree of automation. These systems are very dependent on WFTs and other factory staff to monitor the state of the factory, to continuously react to change, to make rapid logistical decisions, and to initiate and coordinate factory control activity in a timely manner. These WFTs are agents, providing the active element that is lacking in factory control systems. As a result, factory effectiveness in the highly competitive semiconductor industry is quite dependent on the availability, productivity, skill level, and consistency of these human agents. WFTs must monitor and operate a number of tools located in various bays in a fab. They are forced to multiplex across tools, bays, material handling systems and a variety of factory control systems. As a fab's production ramps and more complex processes are introduced, it becomes more difficult to meet the increased complexity and volume without increasing staff or system capabilities. WFTs visibility of upstream and downstream operations, tool state, work-in-process and resource availability is limited.

However, key logistical decisions are frequently based on this limited and dated information, which is only partially provided by factory control systems. WFTs spend a significant amount of time interacting with systems, monitoring factory events and state changes, and performing other non-value added functions, such as MES logging. Shift changes disrupt the operation of the fab as the technicians are temporarily unable to provide required monitoring and coordination. Despite the best efforts of the technicians, utilization of tools suffer, adversely impacting other key factory metrics including cycle time, inventory levels, factory output and mix. With the need for intrabay material handling to transport 12-inch wafers in new 300 mm wafer fabs, significant additional complexity is introduced. Conventional factory control systems are not capable of providing this level of detailed scheduling and execution control.

One area in which these deficiencies hamper efficiency is in maximum queue time compliance. In the course of fabrication a lot of wafers, some process operations will have a "maximum queue time," which is a maximum amount of time the lot can be permitted to wait between two process operations. For instance, assume a scenario in which a lot is first processed in a "sink" operation before being processed in a "furnace" operation. The furnace operation must be performed within a given period of time, known as the "maximum queue time," or the lot will have to be sent to a rework operation. This is known as a "rework" resulting from a "queue time violation." Having to repeat process operations for controllable reasons introduces inefficiency into the operation of the process flow.

The present invention is directed to resolving, or at least reducing, one or all of the problems mentioned above.

SUMMARY OF THE INVENTION

The invention comprises, in its various embodiments and implementations, a method and apparatus for use in an automated manufacturing environment. The method includes autonomously scheduling a consumer manufacturing domain entity for the consumption of services provided by a plurality of provider manufacturing domain entities in an automated process flow; and constraining the autonomous scheduling to lessen queue time violations in the process flow. The apparatus includes a program storage medium encoded with instructions that, when executed by a computing device, performs such a method; a computing apparatus programmed to perform such a method, and an automated process flow implementing such a method.

BRIEF DESCRIPTION OF THE DRAWINGS

The invention may be understood by reference to the following description taken in conjunction with the accompanying drawings, in which like reference numerals identify like elements, and in which.

Figures 1, 2:
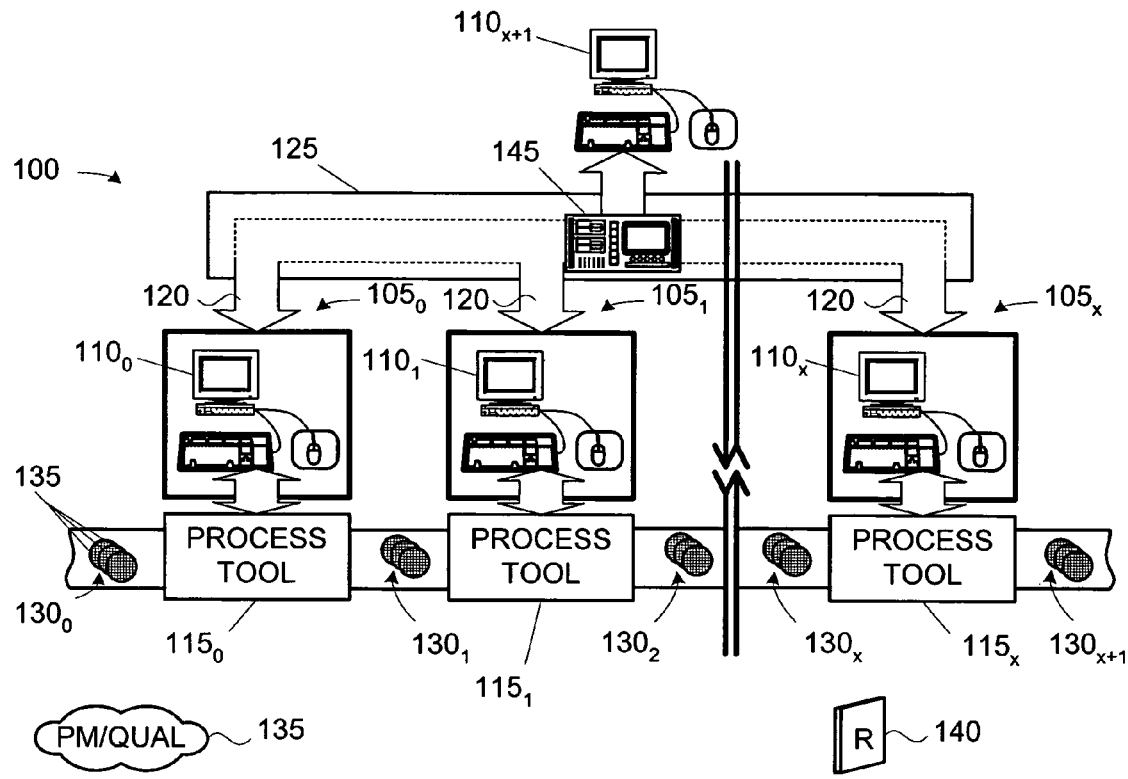
FIG. 1 conceptually depicts a portion of one particular embodiment of a process flow constructed and operated in accordance with the present invention.
FIG. 2 illustrates one particular embodiment of a method in accordance with one aspect of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 conceptually illustrates a portion of one particular embodiment of a process flow 100 constructed and operated in accordance with the present invention. The process flow 100 fabricates semiconductor devices. However, the invention may be applied to other types of manufacturing processes. Thus, in the process flow 100 discussed above, the lots 130 of wafers 135 may more generically referred to as "work pieces." The process tools 115 and any process operation performed thereon need not necessarily be related to the manufacture of semiconductor devices in all embodiments. However, for the sake of clarity and to further an understanding of the invention, the terminology pertaining to semiconductor fabrication shall be retained in disclosing the invention in the context of the illustrated embodiments.

The illustrated portion of the process flow 100 includes a plurality of processing stations $105_0$-$105_x$, each station $105_0$-$105_x$ including a respective computing device $110_0$-$110_x$ communicating with a respective process tool $115_0$-$115_x$. The processing stations $105_0$-$105_x$ communicate with one another over communications links 120. In the illustrated embodiment, the computing devices device $110_0$-$110_x$ and the communications links 120 comprise a portion of a larger computing system 125. The process tools $115_0$-$115_x$ are shown in FIG. 1 processing lots $139_0$-$130_{x+1}$ of wafers 135 that will eventually become integrated circuit devices. The processing tools 115 and lots 130, as will be discussed more fully below, may more generally be referred to as "manufacturing domain entities."

In general, each of the process tools 115 performs some process operation on the lots 130. The process operation will be implementation specific, depending on the process flow and the end product of the manufacturing process. In the illustrated embodiment, for example, individual process stations 115 might layer, pattern, dope, or heat treat the wafers 135 of the lots 130, or some combination of these things. Or, the process stations 115 might perform some evaluation of the process operations performed by other process stations 115. Either way, the process flow 100 comprises the process operations performed by the process stations 115 on the lots 130.

Each lot 130 proceeds through the process flow 100 as part of its manufacture. Consider the lot $130_0$, which must undergo the current process operation on the process tool $115_0$, and the immediately successive process operation on the process tool $115_1$, and other process operations on other successive process tools (e.g., the process tool $115_x$). The process flow 100 is under software-implemented control, discussed more fully below, that generally "schedules ahead" of the present process operation in the illustrated embodiment. More particularly, the control software schedules "appointments" on behalf of, for example, lots 130 and process tools 115 for the process tools 115 to perform process operations on the lots 130. The control software typically attempts to schedule these appointments in advance of completing the current process operation, although sometimes exceptions do occur.

Scheduling also includes, in the illustrated embodiment, management of appointments already made, as conditions change in the process flow 100. For instance, a process operation may take longer to complete than was expected when a subsequent appointment was scheduled, and the subsequent appointment may need to be shifted, expanded, shortened, or canceled. This aspect of scheduling takes advantage of a notification mechanism (not shown) within the process flow 100 to update the manufacturing domain entities of conditions as they change. One particular embodiment of the process flow 100, along with its notification mechanism, is explained below.

In accordance with the present invention, and as illustrated in FIG. 2, a method 200 for use in an automated manufacturing environment, such as the process flow 100, is implemented. The method 200 increases the level of automation in the process flow 100 and improves the efficiency of its operation. The method 200 is particularly useful in the context of "scheduling ahead," as is described above. In general, the method 200 provides a technique for scheduling the consumption of services in a process flow in a manner that attempts to comply with the maximum queue times in the process. This, in turn, makes the process flow 100 more efficient by minimizing the amount of rework that must be performed. It also improves quality since rework may degrade the quality of the end product.

The method 200 begins by autonomously scheduling (at 203, FIG. 2) a consumer manufacturing domain entity for the consumption of services provided by a plurality of provider manufacturing domain entities in an automated process flow. In the context of a process flow, such as the process flow 100, some of the manufacturing domain entities, e.g., the lots 130, are "consumers," i.e., they consume process services. Some of these manufacturing domain entities, e.g., the process tools 115, are "providers," i.e., they provide process services to be consumed. In general, the method 200 calls for autonomously scheduling (at 203, FIG. 2) the consumption of the providers' services.

For instance, a process tool 115 represents a resource that may be consumed, e.g., process time, in the process flow 100. A process tool 115 may be a fabrication tool used to fabricate some portion of the wafers 135, i.e., layer, pattern, dope, or heat treat the wafers 135. A fabrication tool "provides" processing services in the form of processing time. Or, the process tool 115 may be a metrology tool used to evaluate the performance of various parts of the process flow 100. A metrology tool "provides" processing time in the form of evaluation services. Still other kinds of providers may provide other process services to the consumers.

Note some manufacturing domain entities may sometimes be classed as a provider in one context and a consumer in another context, depending on their role in the process flow 100 at any given time. For instance, the process flow 100 may also employ the services of various resources 140, which is a reticle in the illustrated embodiment. A process tool 115 that is a stepper may employ a reticle that may be shared among several steppers. For a stepper to perform its process operation(s) timely, the reticle has to be present in a timely fashion. Thus, the resource 140 "provides" a process service to the process tool 115 in the form of processing time. Thus, a process tool 115 may be a "provider" in that it "provides" process services to the lots 130 and a "consumer" in that "consumes" the process services of the resource 140.

In general, the illustrated embodiment schedules (at 203, FIG. 2) the consumption of process services in terms of "appointments." A particular lot 130, for instance, may have an appointment to be processed on a particular process tool 115 within a given time period. The appointments have certain attributes, as will be discussed further below, that are used to determine whether the appointment will comply with maximum queue time constraints or whether a proposed modification to the appointment will violate queue time constraints.

In terms of the scheduling itself, the illustrated embodiment employs a "contract net negotiation protocol" for scheduling the appointments. The scheduling of the illustrated embodiment is disclosed more fully below. Note, however, that the invention is not so limited. Many negotiation protocols are known to that art. Any suitable negotiation protocol known to the art may be employed in various alternative embodiments.

Returning to FIG. 2, the method 200 continues by constraining (at 209, FIG. 2) the autonomous scheduling to lessen queue time violations in the process flow 100. The constraint manifests itself in a variety of ways in the illustrated embodiment. For instance, a first constraint is applied in negotiating the appointments in the first instance. In this context, an appointment is not negotiated and booked unless it complies with a maximum queue time for the process operation being scheduled. A second constraint is applied in the management of booked appointments, in which an appointment is not shifted, expanded, or shortened if it will result in a queue time violation. Note that some embodiments may employ one of these constraints without the other. Furthermore, alternative constraints may be employed in other embodiments in addition to or in lieu of those listed above.

Note that the application of the present invention will not necessarily prevent queue time violations in all instances. Even if an appointment is originally scheduled so that it complies with maximum queue times, conditions may occur within the process flow 100 that produce a queue time violation. For instance, a lot 130 may be scheduled for an appointment for processing in a process tool 115 when the process tool 115 unexpectedly goes down. Such unexpected downtime sometimes arises when, for example, a process tool 115 breaks down. If there is insufficient time for the lot 130 to schedule a new appointment on an alternative process tool 115, then the lot 130 may exceed its maximum queue time. In the illustrated embodiment, rework scheduling for the lot 130 begins upon realization that the maximum queue time will be violated. Alternative embodiments may wait until an actual queue time violation occurs. Still other embodiments may use other timing mechanisms for scheduling rework or even omit rework altogether.

To more fully and clearly convey the present invention, the illustrated embodiment will now be described in more detail. Referring now to FIG. 1, the process flow 100 comprises more than just the lots 130 and the workstations 105 whose role in the process flow 100 may benefit from scheduling. For instance, a process tool 115 periodically undergoes periodic preventive maintenance ("PM") or Qualification ("Qual") procedures, represented by the graphic 135. The frequency, number, and types of preventive maintenance procedures will vary by well know factors such as the type and age of the process tool 115, elapsed time since the last PM 135, and the extent of use. Although there generally are defined windows in which the PMs 135 should occur, it is generally desirable to schedule them so as to minimize any adverse impact on the process flow 100. Quals 135 are generally performed on reintroduction to the process flow 100 after a PM 135 or upon initial introduction into the process flow 100.

Thus, the method 200 in FIG. 2 may be applied to the scheduling of not only the lots 130 and the process tools 115, but also to PMs/Quals 135 and resources 140 in the illustrated embodiment. Note that the resource 140 may be, in alternative embodiments, e.g., a machine loading resource, one or more dummy wafers, cassettes, WFTs, maintenance technicians, etc. Each of these is a "manufacturing domain entity" because they exist and operate in the "manufacturing domain," i.e., the process flow 100. This categorization is in distinguished from the "virtual domain" in which the software-implemented components of the process flow 100 operate. The software-implemented virtual domain will be disclosed further in greater detail below.

Note, however, that the present invention may not be pertinent to the roles of all the manufacturing domain entities or in all contexts. Maximum queue times are imposed by the lots 130 to prevent rework and are pertinent to the process tools 115 that interact with the lots 130. However, maximum queue times are inapplicable to the PMs/Quals 135, and therefore not pertinent to scheduling between the PMs/Quals 135 and the process tools 115. Thus, maximum queues times are pertinent to the process tools 115 in some scheduling contexts and not in others.

Still referring to FIG. 1, as was mentioned above, the computing devices 110 may also be part of a larger computing system 125 by a connection over the communications links 120. Exemplary computing systems in such an implementation would include local area networks ("LANs"), wide area networks ("WANs"), system area networks ("SANs"), intranets, or even the Internet. The computing system 125 employs a networked client/server architecture, and thus includes one or more servers 145. However, alternative embodiments may employ a peer-to-peer architecture. Thus, in some alternative embodiments, the computing devices 110 may communicate directly with one another. The communications links 120 may be wireless, coaxial cable, optical fiber, or twisted wire pair links, for example. The computing system 125, in embodiments employing one, and the communications links 120 will be implementation specific and may be implemented in any suitable manner known to the art. The computing system 125 may employ any suitable communications protocol known to the art, e.g., Transmission Control Protocol/Internet Protocol ("TCP/IP").

Note that some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figures 3, 4:
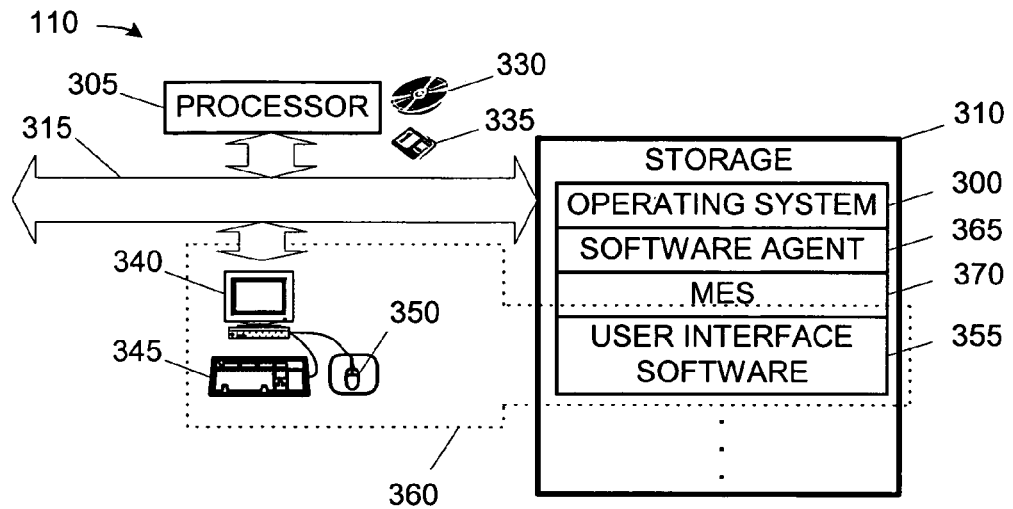
FIG. 3 conceptually depicts, in a partial block diagram, selected portions of the hardware and software architectures, respectively, of the computing devices in FIG. 1.
FIG. 4 conceptually depicts a calendar of booked appointments maintained and employed in accordance with the present invention.

Thus, FIG. 3 depicts selected portions of the hardware and software architectures of the computing devices 110 programmed and operated in accordance with the present invention. Some aspects of the hardware and software architecture (e.g., the individual cards, the basic input/output system ("BIOS"), input/output drivers, etc.) are not shown. These aspects are omitted for the sake of clarity, and so as not to obscure the present invention. As will be appreciated by those of ordinary skill in the art having the benefit of this disclosure, however, the software and hardware architectures of the computing devices 110 will include many such routine features that are omitted from FIG. 3.

In the illustrated embodiment, the computing device 110 is a workstation, employing a UNIX-based operating system 300, although the invention is not so limited. The computing device 110 may be implemented in virtually any type of electronic computing device such as a notebook computer, a desktop computer, a mini-computer, a mainframe computer, or a supercomputer. The computing device 110 may even be, in some alternative embodiments, a processor or controller embedded in the process tool 115. The invention also is not limited to UNIX-based operating systems. Alternative operating systems (e.g., Windows™-based or disk operating system ("DOS")-based) may also be employed. The invention is not limited by these aspects of any particular implementation of the computing device 110.

The computing device 110 also includes a processor 305 communicating with storage 310 over a bus system 315. The storage 310 typically includes at least a hard disk (not shown) and random access memory ("RAM") (also not shown). The computing device 110 may also, in some embodiments, include removable storage such as an optical disk 330, or a floppy electromagnetic disk 335, or some other form, such as a magnetic tape (not shown) or a zip disk (not shown). The computing device 110 includes a monitor 340, keyboard 345, and a mouse 350, which together, along with their associated user interface software 355 comprise a user interface 360. The user interface 360 in the illustrated embodiment is a graphical user interface ("GUI"), although this is not necessary to the practice of the invention.

The processor 305 may be any suitable processor known to the art. For instance, the processor may be a general purpose microprocessor or a digital signal processor ("DSP"). In the illustrated embodiment, the processor 305 is an Athlon™ 64-bit processor commercially available from Advanced Micro Devices, Inc. ("AMD"), but the invention is not so limited. The 64-bit UltraSPARC™ or the 32-bit microSPARC™ from Sun Microsystems, any of the Itanium™ or Pentium™-class processors from Intel Corporation, and the Alpha™ processor from Compaq Computer Corporation might alternatively be employed.

Each computing device 110 may include, in the illustrated embodiment, a software agent 365 residing in the storage 310. Note that the software agents 365 may reside in the process flow 100 in places other than the computing devices 110. The situs of the software agent 365 is not material to the practice of the invention. Note also that, since the situs of the software agents 365 is not material, some computing devices 110 may have multiple software agents 365 residing thereon while other computing devices 110 may not have any. At least a portion of an automated MES 370 resides on at least one computing device 110.

Referring now to both FIG. 1 and FIG. 3, the software agents 365, collectively, are responsible for efficiently scheduling and controlling the lots 130 of wafers 135 through the fabrication process. A part of this responsibility is the implementation of the method 200, in FIG. 2. The software agents 365 each represent some "manufacturing domain entity," e.g., a lot 130, a process tool 115. Thus, some of the software agents 365 represent the interests of consumers, e.g., the lots 130 or PM/Qual procedures 135, in advancing the lots 130 through the process flow 100 in a timely and efficient manner. Some of the software agents 365 represent the interests of providers, e.g., machines such as the process tool 115, in meeting the demands of consumers. As part of their responsibility, the software agents 365 negotiate among themselves for the allocation of those process services for subsequent processing of the lot 130 of wafers 135. The software agents 365 then allocate those services and, ultimately, the services are consumed as the lots 130 move through the process flow 100.

In the illustrated embodiment, the software agents 365 are intelligent, state aware, and imbued with specific goals for which they autonomously initiate behaviors to achieve. The software agents 365 are implemented as objects in an object oriented programming ("OOP") environment, but the invention may be implemented using techniques that are not object oriented. Their behavior is relatively simple and is influenced by scripts, rules and external properties that may be externally configured. The behavior is designed to achieve selected goals such as achieving an assigned lot due date, achieving a predefined level of Quality, maximizing machine utilization, and scheduling opportunistic preventive maintenance. In furtherance of these objectives, the software agents 365 interface with the MES 370 and are integrated with other existing factory control systems (not shown). As will be apparent to those skilled in the art having the benefit of this disclosure, the manner in which this interface and integration occurs is implementation specific, depending upon the makeup and configuration of the MES 370 and the factory control systems.

Collectively, the software agents 365 schedule ahead for each lot 130 one or more operations on a specific qualified process tool 115, including transports and resources, as discussed further below. This scheduling includes the method 200, in FIG. 2. In the illustrated embodiment, for instance, the software agents schedule the lots 130 for processing on the process tools 115, as well as PMs and Quals 135 for the process tools 115. This scheduling includes making optimizing decisions such as running an incomplete batch, as opposed to waiting for an approaching lot 130, and scheduling opportunistic preventive maintenance ("PM") procedures or Qualification tests ("Quals") to meet specifications. The software agents 365 schedule activities such as lot transport and processing, perform MES transactions, monitor processing and transport, and react to deviations from scheduled activities or unscheduled activities.

The scheduling decisions in this particular embodiment are made by the software agents 365 based on a "contract net negotiation protocol," as was mentioned above. To further the implementation of the contract net negotiation protocol, an appointment commitment window concept is used to implement a floating appointment model approach. Each scheduling agent 365 maintains a "calendar" on which it books appointments for the respective manufacturing domain entity, e.g., process tool 115, lot 130, PM/Qual 135, or resource 140. The appointments scheduled through the scheduling decisions of the software agents 365 are "booked" on both the consumer and the provider's calendars. The appointment is booked for a duration in which it is expected the scheduled task will be accomplished.

The illustrated embodiment employs a number of software components specialized to further their functionality in the context of the present invention, although this is not necessary to the practice of the invention. The software agents 365 (shown in FIG. 3), for example, are specialized along a number of lines—namely, by their functionality (e.g., scheduling, processing) and by the type of manufacturing domain entity they represent (e.g., lot, processing tool, resource). The specialized software agents 365 create and maintain a calendar of appointments for each manufacturing domain entity that is also specialized by the type of entity. The appointments, too, are specialized according to the type of manufacturing domain entities involved. Each of these specializations will now be briefly discussed in turn.

As was mentioned above, the illustrated embodiment specializes the software agents 365 along several lines. In general, the software agents 365 may be classed by their functionality (e.g., scheduling, processing) and by the type of manufacturing domain entity they represent (e.g., lot, processing tool, resource). Thus, the illustrated embodiments employs the classes of software agents 365 shown in Table 1.

TABLE 1

| Agent Classes, Subclasses, and Definitions | | |
| --- | --- | --- |
| Agent Class | Agent Subclass | Subclass Definition |
| Scheduling Agent Class | LSA | Schedule appointments on behalf of a specified lot |
| | MSA | Schedule appointments with other scheduling agents on behalf of a specified process tool |
| | RSA | Schedule appointments with other scheduling agents on behalf of a resource |
| | PM scheduling agents ("PMSAs") | Schedule specified PM and Qual appointments on behalf of PM or Qual procedures for a specified process tool and, sometimes, with RSAs for use of a resource during the PM or Qual appointment |
| Processing Agent | Lot Processing Agents ("LPAs") | Initiate execution of move appointments |
| | Machine Processing Agents ("MPAs") | Initiate execution of setup and lot processing (including downloading recipes and performing MES transactions) |
| | Resource Processing Agents ("RPAs") | Initiate execution of scheduled activities for resources, such as processing appointments, carrier-ins, unloads, and transports |
| | PM Processing Agents ("PMPAs") | Initiate execution of PM and Qual appointments by, for example, notifying maintenance technicians to perform PMs or Quals |

TABLE 1-continued

| Agent Classes, Subclasses, and Definitions | | |
| --- | --- | --- |
| Agent Class | Agent Subclass | Subclass Definition |
| Starvation Avoidance Lot Start Agent ("SALSA") | SALSA | Determines when new lots are introduced into the process flow of the physical factory and initiates their introduction into the process flow |

However, specializations may be employed within the general classes of Table B to tailor a given implementation. Manufacturing domain entities might possess different characteristics for which a respective software agent 365 might advantageously be specialized. In one particular implementation, the machine scheduling agents differentiate as to whether they represent process tools 115 that are batch or are sequential ("cascading"), or whether they process by wafer, by lot, by batch, etc. Resource agents may likewise be specialized by whether they represent dedicated resources (e.g., a loading resource used by only one machine) or a shared resource (e.g., a wafer fab tech, reticle, or empty carrier) that may be shared among multiple process tools 115. Lot agents may also be specialized according to their priority, product, product family, or other attributes that mitigate for differentiation of behavior. PM/Qual agents also may be specialized.

Still other specializations may be employed in alternative embodiments. More concretely, the illustrated embodiment employs the specialized machine agents set forth in Table 2. This particular embodiment implements the agents using object oriented programming techniques and the baseline agents provide the class definition and the others are subclasses of that class. Thus, for example, the Machine Processing Agent and Machine Scheduling Agent of Table B are the Baseline Processing Agent and Baseline Scheduling Agent of Table 2, and provides the class definition for the remaining machine agents of Table 2, which as subclasses of the Baseline Processing Agent.

TABLE 2

| Machine Agents | | |
| --- | --- | --- |
| Baseline Processing Agent | Wafer-Based Processing Agent | Wafer-Based, Sequential Processing Agent |
| Wafer-Based Batch Sequential Processing Agent | Wafer-Based, Batch Processing Agent | Lot Based Processing Agent |
| Lot-Based, Sequential Processing Agent | Lot-Based, Batch Processing Agent | Lot-Based Batch Sequential Processing Agent |
| Baseline Scheduling Agent | Wafer-Based Scheduling Agent | Wafer-Based, Sequential Scheduling Agent |
| Wafer-Based, Batch Sequential Scheduling Agent | Wafer-Based, Batch Scheduling Agent | Lot-Based Scheduling Agent |
| Lot-Based, Sequential Scheduling Agent | Lot-Based, Batch Scheduling Agent | Lot-Based Batch Sequential Scheduling Agent. |

Calendar specializations primarily track the specializations of the type of manufacturing domain entity with which they are associated. Furthermore, as with the machine agents, the specialization can be developed within the broad classes of lot calendars, machine calendars, resource calendars, and PM/Qual calendars. The OOP implementation of the illustrated embodiment facilitates this specialization through inherited properties. Table 3 lists the class and subclasses of scheduling calendars used in the illustrated embodiment. Note that not every calendar class has subclasses.

TABLE 3

Calendar Specialization Hierarchy

| Calendar Class | Calendar Subclass (1) | Calendar Subclass (2) |
|---|---|---|
| Machine Calendar | Batch Machine Calendar | Lot Batch Machine Calendar |
| | | Wafer Batch Machine Calendar |
| | Lot Machine Calendar | N/A |
| | Wafer Machine Calendar | N/A |
| | Sequential Machine Calendar | Wafer Sequential Machine Calendar |
| | | Wafer Batch Sequential Machine Calendar |
| | | Lot Batch Sequential Machine Calendar |
| | | Lot Sequential Machine Calendar |
| PM Calendar | N/A | N/A |
| Lot Calendar | N/A | N/A |
| Resource Calendar | Shared Resource Calendar | WFT Calendar |
| | | Empty Carrier Calendar |
| | | MT Calendar |
| | | Reticle Calendar |
| | Dedicated Resource Calendar | Loading Resource Calendar |

Thus, as was mentioned above, the type of appointments scheduled on any given calendar will depend largely on the nature of the entity that the software agent 365 that is keeping the calendar represents and the degree of agent and calendar specialization. In the illustrated embodiment, there are four types of scheduling agents as is set forth in Table B: MSA, LSA, RSA and PMSA. Each scheduling agent will have its own scheduling calendar to store its booked appointments: machine calendar, lot calendar, resource calendar, and PM calendar.

Appointments may also be specialized. In general, an "appointment" has a "processing window" ("PW"). A processing window is a time interval of an estimated duration for providing services defined by an Appointment Start Time ("TS") and an Appointment End Time ("TE"). In the floating appointment approach, most appointments have a "commitment window" ("CW") within which the process window PW may float. A "commitment window" is a time interval within which the service is to be provided. The start time of the commitment window CW is defined by the Earliest Start Time ("EST") when the consumer can be available for the service. The end time of the commitment window is defined by the provider's Latest Delivery Time ("$LDT_P$") for the service. Note that the $LDT_P$ may be different from the $LDT_C$.

More particularly, FIG. 4 conceptually illustrates a calendar 400 storing information concerning appointments for a lot 130 on a number of process tools 115. In FIG. 4, the LSA 705 for the lot 130 has booked appointments $APP_1$-$APP_4$ for the lot 130 to be processed on the process tools $T_1$-$T_2$, respectively. Note that some information ordinarily retained in a calendar 400 for a lot 130 has been omitted for the sake of clarity and so as not to obscure the present invention. For instance, as will be discussed further below, a lot calendar 400 will typically also include "move" appointments, but no move appointments are shown in FIG. 4 The appointment information for $T_1$-$T_7$ illustrated in FIG. 4 is as follows:

$T_1$: $APP_1[t_{10},t_{12}]$, $CW_1[t_8,t_{14}]$
$T_2$: $APP_2[t_{13},t_{15}]$, $CW_2[t_9,t_{16}]$, $MQT[t_{12},t_{16}]$
$T_3$: $APP_3[t_5,t_7]$, $CW_3[t_2,t_{11}]$
$T_7$: $APP_4[t_3,t_4]$, $CW_4[t_1,t_6]$

The appointments $APP_1$-$APP_4$ represent processing windows within the commitment windows $CW_1$-$CW_4$. Note that, in the illustrated embodiment, several of the commitment windows overlap but none of the appointments do. However, in alternative implementations, this may not always be the case, as will be discussed further below.

In the context of appointments, specialization is manifested in the attributes of the appointments. Besides the process window and the commitment window, an appointment may have other attributes depending on the nature of the appointment depending upon the appointment's specialization. Table 4 sets forth a number of appointment specializations that may be employed in various alternative embodiments.

TABLE 4

Appointments Booked by Scheduling Agents

| Agent Type | Calendar Type | Appt. Type | Appointment Description |
|---|---|---|---|
| LSA | Lot | Move | The lot is transported to the process tools. |
| | | Lot | The lot is processed on the process tools. |
| | | Carrier-In | The lot is loaded into the process tools. |
| | | Carrier-Out | The lot is unloaded from the process tools. |
| | | Feeder | The lot accounts for the cycle time of upstream, non-control operations when scheduling several operations in advance. |
| | | Max Move | The lot accounts for transport time from a feeder appointment until accurate moves can be scheduled from a specific process tool. |
| MSA | Machine | Lot Processing | A lot is processed on the process tools. |
| | | Setup | Process tool is prepared, or "setup," for a different type of processing than it is currently processing. |
| | | PM | PM is performed on the process tool. |
| | | Qual | Stand-alone Qual is performed on the respective process tool. |
| | | Machine Batch | Multiple lots are assembled into a batch and processed simultaneously. |
| | | Unscheduled Downtime | Period in which machine is unexpectedly down, and set for anticipated duration. |

TABLE 4-continued

Appointments Booked by Scheduling Agents

| Agent Type | Calendar Type | Appt. Type | Appointment Description |
|---|---|---|---|
| PMSA | PM | PM | PM and any follow-up Quals required by the PM are performed on a process tool. |
| | | Qual | Stand-alone Qual is performed on a process tool. |
| RSA | Resource | Carrier-in Lot | Resource loads a lot into a process tool. |
| | | Carrier-out Lot | Resource unloads lot from the process tool. |
| | | Charge Lot | Process tool and resource specific appointment in which, e.g., loaded lots are placed into a furnace tube by a furnace loader. |
| | | Discharge Lot | Process tool and resource specific appointment in which, e.g., loaded lots are removed from a furnace tube by a furnace loader. |
| | | Resource Carrier-in Batch | Resource loads a batch onto a process tool. |
| | | Resource Carrier-out Batch | Resource unloads a batch from a process tool. |
| | | Resource Charge Batch | Resource charges a batch into a portion of the respective process tool. |
| | | Resource Discharge Batch | An appointment for the associated resource to discharge a batch from a portion of the respective process tool. |
| | | PM | PM is performed on the process tool. |
| | | Qual | Qual is performed on the process tool. |
| | | Downtime | Resource is expected to be down due to an unanticipated problem. |

For example, a move appointment will have attributes including source location and the target location to represent the source and the destination of the move. A lot processing appointment will have attributes including transport start time and remaining transport time which will be used to calculate the dynamic earliest start time of the appointment. If a carrier in operation is involved in a process operation, the corresponding lot processing appointment will have two extra attributes for the carrier-in start time and the remaining carrier-in time. The dynamic EST of this lot processing appointment can therefore be derived from these four attributes together with the current time and static EST. Some appointments will share some same properties. For example: all the appointments have a processing window and an appointment ID, all the lot appointments will have a reference of a lot, and all the batch appointments will have a list of all the batch participants.

One attribute that some appointments may have is the "maximum queue time" ("MQT"), as was mentioned above. The maximum queue time appears as an attribute of selected lot appointments. In the illustrated embodiment, the lots 130 do not impose "maximum queue times" for all lot appointments. Not all process operations require a maximum queue time to avoid rework. The illustrated embodiment does not impose a maximum queue time if no rework will be required by unduly long queue times. For example, in FIG. 4, only appointment $APP_2$ includes an attribute for maximum queue time. However, alternative embodiments may impose maximum queue times for all lot appointments. In these alternative embodiments, the maximum queue time may default to some standard maximum in the absence of a relevant, specific maximum queue time.

Figure 5:
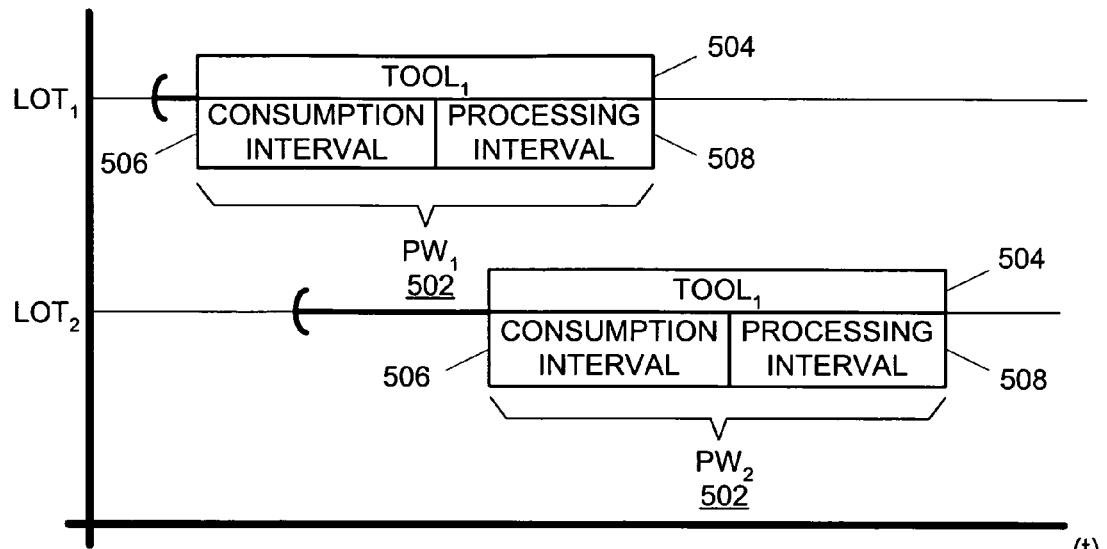
FIG. 5 conceptually illustrates one particular implementation in which some portions of some appointments are permitted to overlap.

Note that, in cases where the process tool 115 is a sequential machine, some portions of some appointments may overlap. As is shown in FIG. 5, the processing window PW 502 of an appointment 504 in these calendars will have two intervals: a consumption interval 506 and a processing interval 508. (Note that the concomitant commitment windows are omitted in FIG. 5 for the sake of clarity.) In the consumption interval 506, the lots 130 are entering the process tool 115 (i.e., being "consumed") for processing. The processing interval 508 is then defined to be everything else in the PW 502 after the consumption interval 506.

The processing interval of one appointment may overlap with the consumption interval of another appointment with the same setup requirements, but none of the consumption intervals can overlap. In FIG. 5, the lots $LOT_1$, $LOT_2$ have scheduled appointments 504 on the process tool $TOOL_1$ wherein the consumption interval 506 for the appointment 504 of the lot $LOT_2$ overlaps the processing interval 508 of the appointment 504 for the lot $LOT_1$. Note, however, that lot processing appointments requiring different setups cannot be overlapped even on this type of specialized machine calendar.

Figure 6:
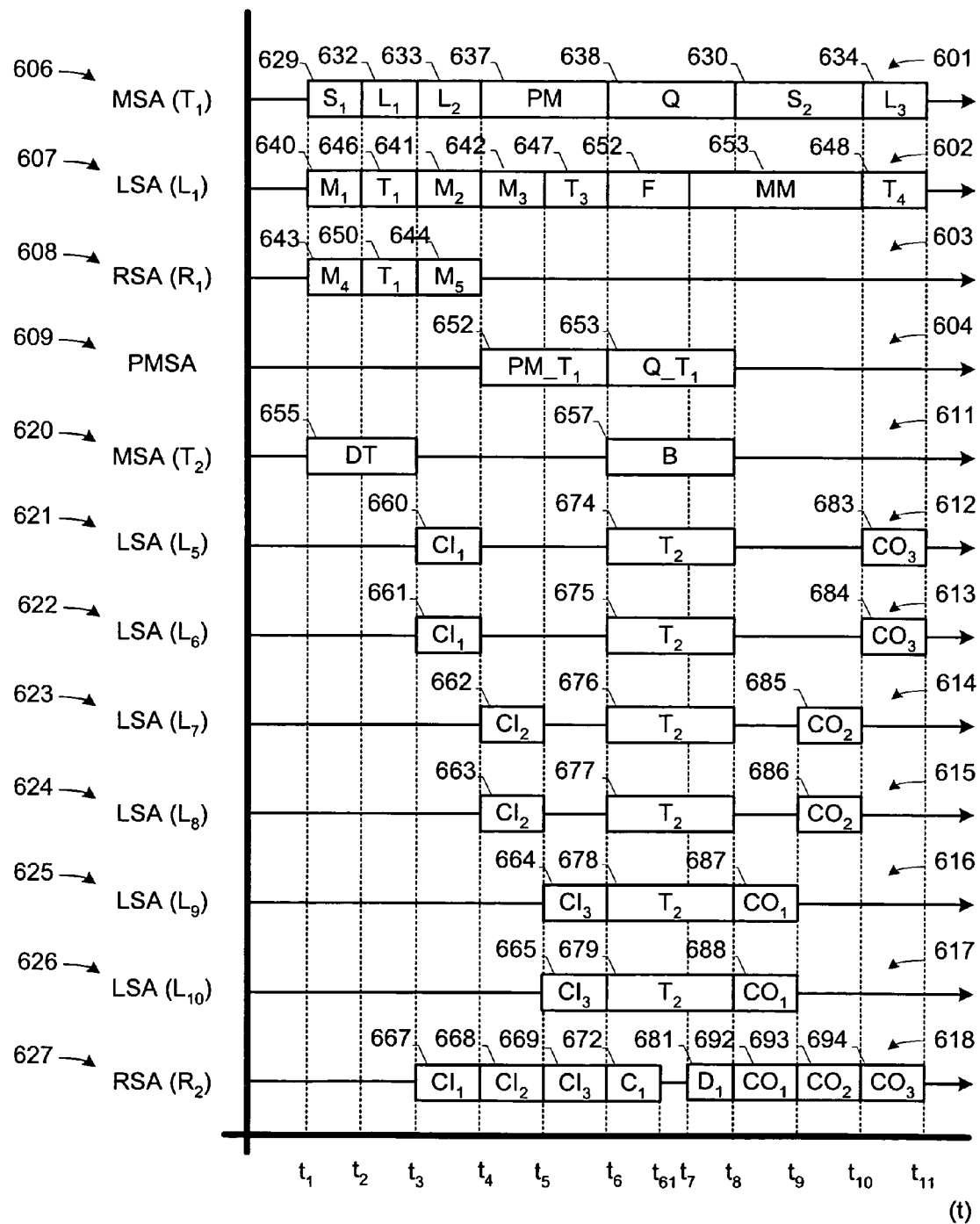
FIG. 6 conceptually depicts a number of calendars of booked appointments illustrating selected aspects of the interaction and characteristics of the calendars and scheduling agents.

To present an overview and to help illustrate how agent, calendar, and appointment specializations interact in the illustrated embodiment, FIG. 6 conceptually illustrates a variety of calendars to help illustrate the various types of appointments kept by various types of calendars in the illustrated embodiment. FIG. 6 also helps illustrate how some of appointment types on some calendars are booked with "corresponding" appointments on other types of calendars. More particularly, FIG. 6 depicts:

a machine calendar 601 for a process tool $T_1$ maintained by a MSA 606;
a lot calendar 602 for a lot $L_1$ maintained by a LSA 607;
a resource calendar 603 for a machine resource $R_1$ maintained by a RSA 608; and
a PM calendar 604 for preventive maintenance maintained by a PMSA 609.

FIG. 6 also illustrates:
a machine calendar 611 for a process tool $T_2$ kept by a MSA 620;

a plurality of lot calendars 612-617, each for a respective lot $L_5$-$L_{10}$ kept by a respective LSA 621-626; and a resource calendar 618 for a machine loading resource $R_2$ kept by a RSA 627.

In the illustration of FIG. 6, as opposed to the illustration of FIG. 4, all appointments for a given calendar are collapsed onto a single timeline. The commitment windows for each appointment are omitted to facilitate this collapse and to keep from unduly cluttering the illustration. A brief discussion of the various kinds of appointments summarized in Table 1 and illustrated in FIG. 6 for this particular embodiment follows immediately below.

MSAs (e.g., MSAs 606, 620) schedule and book a number of types of appointments summarized in Table 1. In FIG. 6, a MSA 606 for the tool $T_1$ books several kinds of appointments on the machine calendar 610. These include: the setup appointments 629-630; the lot processing appointments 632-634; a PM 637; and a stand-alone Qual 638. As is shown on the machine calendar 615 for the tool $T_2$, the MSA 620 booked a machine batch appointment 657 and a downtime appointment 655. Note that, in the illustrated embodiment, some appointments may be scheduled for any process tool 115, e.g., the setup appointments 629-630, lot processing appointments 632-634, the PM appointment 637, and the Qual appointment 638. However, some may not. For instance, the batch appointment 657 cannot be scheduled on process tools 115 that do not perform batch operations. (Note that, for batches, lot processing appointments are not scheduled directly on the machine calendar. Rather, they are booked as participants of the batch appointment.) Some embodiments may also employ alternative kinds of appointments.

The lot processing appointments 632-634 are the appointments in which the tool $T_1$ is scheduled to actually perform the processing on the lots $L_1$, $L_2$, $L_3$. As will be appreciated by those skilled in the art having the benefit of this disclosure, the tools $T_1$, $T_2$ will occasionally have to undergo a "setup" in preparation for processing a given lot. All else being equal, it is generally preferable to reduce the number of setups by scheduling lots requiring the same setup successively. Such is the case for the lots $L_1$, $L_2$ on the tool $T_1$, whose lot processing appointments 632-633 are scheduled together after the setup appointment 629 since they require the common setup $S_1$. These types of preferences are realized in the scheduling process in the formulation of bids discussed above. More particularly, cost factors are apportioned in the bidding process to encourage lot processing appointments having common setups to be scheduled together. However, in FIG. 6, the lot $L_3$ requires a new setup $S_2$, and the MSA 606 has scheduled a separate setup appointment 630 prior to the lot processing appointment 634. Note that, although not shown, setup appointments are scheduled in a similar fashion for tools (e.g., the tool $T_2$) on which batch operations are performed.

As the name implies, the batch appointment 657 is an appointment on a process tool 115 (e.g., $T_2$) to process a batch of lots 130. Each lot 130 (e.g., $L_5$-$L_{10}$) is considered a "participant" in the batch, and the batch appointment actually comprises a plurality of "participant" appointments (not shown). Participant appointments are, in actuality, lot processing appointments that describe the makeup of the batch. In the illustrated embodiment, the lot appointments 674-679 are counterpart "participant appointments" for the batch appointment 674. Lots 130 may be added to or removed from a batch by joining, removing, canceling, and/or bumping individual participant appointments. If the batch needs loading onto the process tool 115, the RSA 627 will schedule carrier-in and carrier-out appointments 667-669, 693-694 in a manner discussed more fully below.

As summarized in Table 1, the LSAs 607, 621-626 for the lots $L_1$, $L_5$-$L_{10}$ usually books six kinds of appointments on the lot calendars 602, 612-617: the move appointments 640-642; the lot appointments 646-648, 674-679; a maximum move appointment 653; a feeder appointment 652; carrier-in appointments 660-665 (e.g., $LD_1$, $LD_2$, $LD_3$); and carrier-out appointments 683-688 (e.g., $LL_1$, $UL_2$, $UL_3$). The move appointments 640-642 and lot appointments 646-648, 674-679 are scheduled where all the parameters used to schedule with certainty are known.

The maximum move appointment 653 and feeder appointment 652 are scheduled as "place holders" on the calendar until sufficient certainty is achieved, i.e., both the source and destination process tools 115 are known and move durations can be determined. In the illustrated embodiment, appointments may be scheduled for process operations that are further downstream than the immediately successive process operation. In this circumstance, the intervening process operations may not be scheduled. To account for these unscheduled, intervening process operations, one or more move appointment(s) 653 and/or feeder appointment(s) 652 may be scheduled.

Note that feeder and maximum move appointments represent explicit, as opposed to implicit, constraints on the scheduling process. Explicit constraints are represented as appointments on the calendars that directly affect the scheduling and booking of other appointments. Examples of explicit constraints include, but are not limited to, move, carrier-in, unload, maxmove, and feeder appointments. These appointments explicitly constrain the scheduling of the lot appointments on the lot calendar. Implicit constraints are not represented as appointments on the calendar, but rather as attributes of the appointments they affect. For example, the lot processing appointment on the machine calendar has attributes that represent the constraints of carrier-in, transport, and carrier-out because these constraints are not represented by appointments on the machine calendar. Similarly, discharge duration, like the UST and RUT, discussed above, also is an implicit constraint. Like the UST and the RUT, the discharge duration is not a hard constraint—so, it does not affect the dynamic EST, but it does constrain shifting because carrier-in or carrier-out related to the next batch appointment cannot overlap with the discharge.

For some process operations, the process tool 115 (e.g., the tool $T_2$) may require loading and unloading the lot 130. The act of loading is sometimes also referred to as "carrier-in" and the act of loading is also sometimes referred to as "carrier-out". For those operations, the LSA (e.g., the LSAs 621-626) will book lot carrier-in and lot carrier-out appointments (e.g., the carrier-in and carrier-out appointments 660-665, 683-688) on its own calendar (e.g., the lot calendars 612-617). These carrier-in and carrier-out appointments match the carrier-in and carrier-out appointments (e.g., the carrier-in and carrier-out appointments 667-669, 692-694) scheduled by the RSA (e.g., the RSA 627) on its calendar (e.g., the resource calendar 618).

In FIG. 6, the tool $T_2$ requires loading, and the resource $R_2$ loads the lots $L_5$-$L_{10}$ on the tool $T_2$ in a manner more fully described below. Consequently, the RSA 627 for the resource calendar 618 for the resource $R_2$ includes carrier-in appointments 667-669 and carrier-out appointments 692-694 in which the resource $R_2$ is scheduled to load the lots $L_5$-$L_{10}$ on the tool $T_2$. Note that each of the lot calendars 612-617 includes carrier-in and carrier-out appointments 660-665 and 683-688 that are counterparts to the carrier-in appointments 667-669 and carrier-out appointments 692-694 on the resource calendar 618. Note further that the machine calendar 611 for the tool $T_2$ does not contain any carrier-in or carrier-out appointments, but the lot processing appointment has attributes representing these implicit constraints.

The PMSA 609, as summarized in Table 1, books two kinds of appointments on the calendar 630: PM appointments such as the PM appointment 652, and stand-alone Quals such as the Qual appointment 653. The PMSA 609 schedules PMs and Quals opportunistically, but in accordance with known constraints on when they should be scheduled. The calendar 630 shows only the one PM appointment 652 and the one Qual appointment 653 scheduled for the tool $T_1$. Note that the machine calendar includes counterpart PM and Qual appointments 637-638 booked thereon. Multiple PMs and Quals may be performed on a tool, and so the machine and PM calendars 601, 693 in an actual embodiment may include multiple PM and Qual appointments for one tool. Some PMs are required to be followed by one or more follow-up Quals before the process tool 115 can be reintroduced to the process flow 700. In these circumstances, the follow-up Quals are automatically scheduled within the PM appointment.

RSAs (e.g., the RSAs 608, 627), in the illustrated embodiment, are specialized by the kind of resource they represent. There generally are two kinds of resources: shared resources and dedicated resources. Shared resources are resources that may be shared by multiple process tools 115, such as a reticle that may be shared by multiple steppers. Dedicated resources, such as machine loaders (not shown) operate in conjunction with a single process tool 115. This type of specialization of resource calendars is but one salutary variation permitted by the use of specialized agents discussed above.

The types of appointments booked by a RSA depends on the type of resource it represents. The shared RSA 608 for the resource $R_1$, shown in FIG. 6, books at least two kinds of appointments on its own resource calendar 603: resource consumption appointments such as the resource consumption appointment 650 and move appointments such as the move appointments 643, 644. Since the resource $R_1$ is shared by several process tools 115 (e.g., $T_1$), it may need to be moved among the process tools 115—hence, the move appointments 643, 644. Note that the moves themselves may be performed by still other resources (not shown) and a shared resource such as a reticle may be moved to a storage location such as a reticle stocker when it is not being used at a process tool.

The dedicated RSA 627 schedules appointments related to its dedicated process tool 115 (e.g., $T_2$) only. In the illustrated embodiment, the dedicated RSA 627 represents a machine loading resource (not shown) for a furnace (also not shown). The dedicated RSA 627 books four kinds of appointments on the calendar 640: the carrier-in appointments 667-672; the charge appointment 672; the discharge appointment 681; and the carrier-out appointments 692-694. The carrier-in appointments 667-672, charge appointment 672, discharge appointment 681, and carrier-out appointments 692-694 are implementation specific and are discussed in more detail immediately below.

Some process tools 115 (e.g., $T_2$) perform lot batch process operations in which multiple lots 130 are simultaneously processed in a batch. Some of these process tools 115 use carrier-in, charge, discharge and carrier-out steps. In the embodiment of FIG. 6, the tool $T_2$ first loads all the batch participants, i.e., lots 130, from the tool I/O ports (not shown) to the tool internal stocker (also not shown). Usually this type of process tools 115 has multiple I/O ports, and the carrier-in/carrier-out operations are also performed in batches. As previously mentioned, on the machine calendar 611, the batch appointment actually contains participants that are each lot processing appointments, one for each lot 130 in the batch.

Carrier-out (i.e., unloading) is the reverse of carrier-in (i.e., loading). The carrier-out appointments 692-694 also each have two counterparts appointments on the lot scheduling calendars 612-617, one for each participant in that particular sub-batch unload. The carrier-out appointment 692 has counterpart carrier-out appointments 688, 687 on the lot calendars 616, 617; the carrier-out appointment 693 has counterpart carrier-out appointments 685, 686 on the lot calendars 614, 615; and the carrier-out appointment 694 has counterpart carrier-out appointments 683, 684 on the lot calendars 612, 613. Note that the sequence for carrier-out is independent of the sequence for carrier-in. Loading sequence is primarily dependent on arrival time (EST) of the lots 130, while unloading sequence may depend on the priority of the lot 130 or the time of its next appointment.

In FIG. 6, the results of the interaction of the MSAs 606, 620; LSAs 607, 621-626; RSAs 608, 627, and the PMSA 609 can be seen by comparing the various calendars. The lot processing appointment $L_1$ is scheduled on the machine calendar 601 for $[t_1, t_2]$, on the reticle calendar 640 and on the lot calendar 620 as $T_1$ for the same period. However, note that the MSA 606 considers the setup $S_1$ and the LSA 607 considers the move $M_1$ in scheduling this appointment.

Similarly, the PM is scheduled on the machine calendar 601 for the tool $T_1$ and on the preventive maintenance calendar 604 for the period $[t_4, t_6]$ and the Qual is scheduled on the machine and PM calendars 601, 604 for the period $[t_6, t_8]$. For the batch process operations require carrier-in, charging, discharging and carrier-out steps, a lot carrier-in appointment and a lot carrier-out appointment are scheduled on the lot calendars 612-517 and a batch carrier-in appointment and a batch carrier-out appointment with the same time interval as those on the lot calendar are scheduled on the loading resource calendar 618. A batch lot processing appointment is scheduled on the machine calendar 611 for $[t_6, t_8]$, a batch charge appointment for the period $[t_6, t_{61}]$ and a batch discharge appointment for the period $[t_7, t_8]$ are scheduled on the loading resource calendar 618.

As is apparent from this discussion, some appointments are scheduled along with "corresponding" appointments on other calendars. "Corresponding" appointments are appointments booked on different calendars in furtherance of the same activity. For example:

a lot appointment and a corresponding lot processing appointment will appear on the lot scheduling calendar and the machine scheduling calendar; respectively;

a PM appointment and a corresponding machine PM appointment will appear on the PM scheduling calendar and machine scheduling calendar, respectively; and a lot carrier-in appointment and a corresponding resource carrier-in appointment will appear on the lot scheduling calendar and loading resource scheduling calendar, respectively, if a carrier-in operation is required on the process tool for the process operation.

These corresponding appointments are "synchronized," i.e., a change in one appointment triggers the change in the other so that they will have the same characteristics (e.g., start time, end time, etc.). Thus, as changes in appointment change or in the appointments themselves occur, the changes need to be propagated to corresponding appointments on other calendars.

Figure 7:
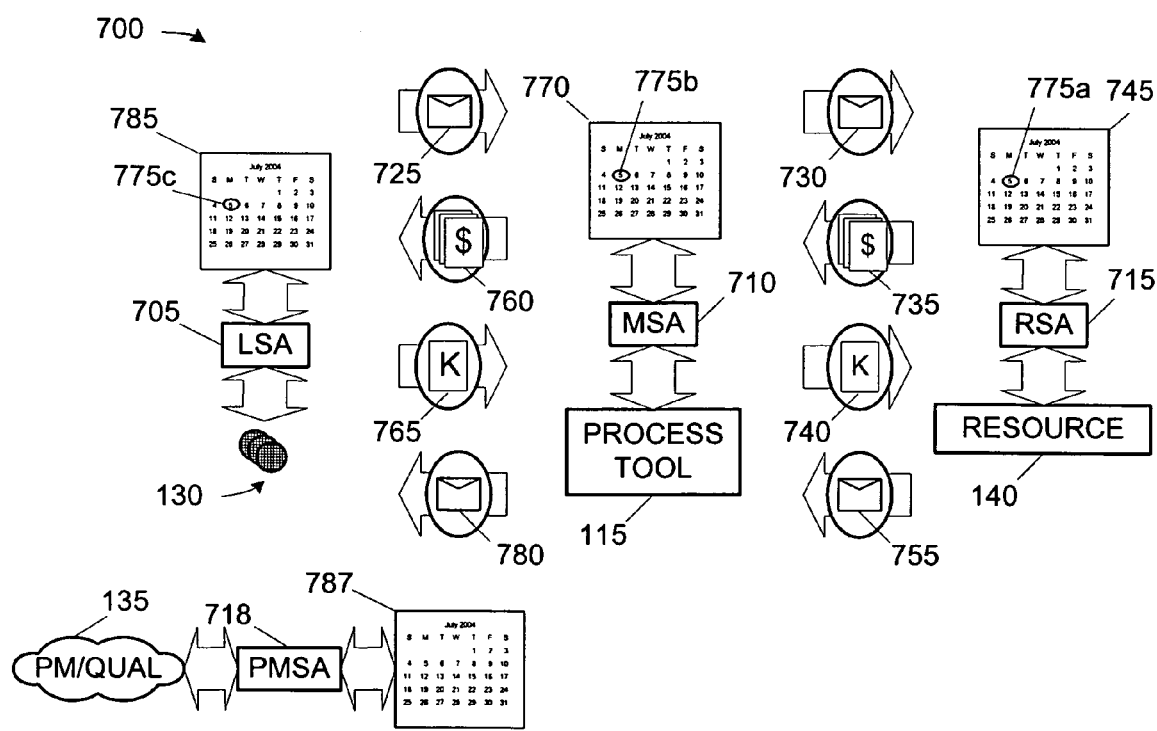
FIG. 7 conceptually depicts one particular implementation of the apparatus of FIG. 1, i.e., a portion of a process flow from a semiconductor fabrication facility, and the manner in which it schedules appointments for the consumption of resources.

FIG. 7 illustrates the negotiation for and scheduling of appointments using the contract net negotiation protocol in one particular implementation 700 of the process flow 100 first shown in FIG. 1. In this particular embodiment, the process flow 700 includes, in addition to the lots 130, process tools 115, PM/Qual 135, and resource 140:

- a lot scheduling agent ("LSA") 705 representing the lot 130, which is a consumer of processing services;
- a machine scheduling agent ("MSA") 710 representing the process tool 115, which is both a consumer and a provider of processing services, depending on the context in which it is operating;
- a resource scheduling agent ("RSA") 715 representing the resource 140, which is a provider of processing services; and
- a PM scheduling agent ("PMSA") 718 which represents PMs and Quals 135, which are consumers of processing services.

In the illustrated embodiment, the lot 130, process tool 115, resource 140, and PMs and Quals 135 also have corresponding "processing" agents (not shown). The scheduling agents pass control to the processing agents when it is time to execute the scheduled activity.

Each of the scheduling agents 705, 710, 715, and 718, maintains and uses a respective calendar 785, 770, 745, and 787. The illustrated embodiment also specializes calendars used for scheduling and managing appointments, as is discussed more fully below. Note, however, that this, too, is not required for the practice of the invention. Nevertheless:

- the LSA 705 keeps a lot calendar 785;
- the MSA 710 keeps a machine calendar 770;
- the RSA 715 keeps a resource calendar 745; and
- the PMSA 718 keeps a PM calendar 787.

The types of appointments booked on the calendars will depend on the nature of the entity represented by the scheduling agent 365. In the illustrated embodiment, for instance, the scheduling agents 705, 710, 715, and 718 book the types of appointments set forth in Table 1 on the calendars 785, 770, 745, and 787, respectively.

Note that some PMs invoke the performance of follow-up Quals before the process tool 115 can be reintroduced to the process flow 100. Other Quals, however, are "stand-alone" Quals, i.e. they are not invoked by the occurrence of a PM. Follow-up Quals, as opposed to stand-alone Quals, should be performed after the PM that invokes them before any other kind of appointment. The illustrated embodiment therefore treats follow-up Quals as part of the PM that invoices them. Follow-up Quals are automatically scheduled to be performed upon completion of the PM that invoked them. The follow-up Quals are not represented by separate appointments on the machine and PM calendars 770, and the duration of the scheduled PM appointments is sufficient not only for the PM, but also any follow-ups Qual it invokes. Thus, Qual appointments are scheduled on the machine and PM calendars only for stand-alone Quals.

The LSA 705 tries to keep the lot 130 that it represents on schedule and to preserve quality by reducing rework. One part of this effort is the reduction of rework through application of the invention as represented by the method 200, in FIG. 2. The MSA 710 tries to maximize utilization of the process tool 115 it represents. Similarly, the RSA 715 tries to maximize utilization of the resource 140. In the course of their representation, both the MSA 710 and the RSA 715 are cognizant of maximum queue times imposed by the lots 130. The PMSA 718 opportunistically schedules PMs and Quals on, inter alia, the process tool 115. The various agents 705, 710, 715, and 718 do this concurrently in the context of negotiating appointments for the consumption of processing services by adjusting the prices they offer or budgets to pay for services in accordance with the schedules they need to meet or want to keep.

More particularly, a lot 130 typically negotiates with a number of process tools 115. The LSA 705 tries to find a time slot offered by a process tool 115 that will allow the lot 130 to meet its due date, comply with maximum queue times, and feed the next bottleneck machine station at the appropriate time. At the same time, the MSA 710 tries to acquire lots 130 for processing in a way that optimizes the utilization of the process tool 115. The goals of the MSA 710 are to maximize the overall utilization of its respective process tool 115, respect the relative priority of the lots 130, reduce setup or recipe changes, and optimize its batch size. This collaboration of agent interaction results in the scheduling of a lot 130 on a particular process tool 115 within a specified time window.

In general terms, consumers of processing services initiate negotiations for those services. For instance, the LSA 705 begins the negotiation by publishing a "request bid" message 725 to all of the MSAs 710 representing process tools 115 capable of performing a desired manufacturing operation. The bid request message 725 will include variety of information permitting the MSAs 710 to formulate acceptable bids, including the maximum queue time. At this point, a MSA 710 is acting as a provider because the process tool 115 is providing services, i.e., processing time.

The MSA 710 for each capable process tool 115, upon receipt of the request bid message 725, identifies a potential bid, and recognizes whether it will need a Qualified resource 140 to perform the job. If so, the MSA 710 publishes its own request bid message 730 to the RSAs 715 of all capable resources 140. The MSA 710 has now shifted from a provider at this point to a consumer since the process tool 115 is now consuming process services, i.e., time with the resource 140. Each RSA 715 representing a Qualified resource 140 submits one or more bids 735, one of which the MSA 710 selects for inclusion in its bid 760. The MSA 710, having now identified the necessary resources, returns to its role as a provider of processing services. If another potential bid is identified by the MSA 710, it once again requests bids from the appropriate RSAs 715.

Each MSA 710 representing a capable process tool 115 submits one or more bids 760 to the LSA 705 that published the request bid message 725. These bids 760 will be generated by using, in the illustrated embodiment, searches on the machine calendar 770 for open time slots using existing setups; open time slots requiring new setups; time slots where a lot 130 can join an existing batch; time slots where lots 130 can join an existing batch by bumping another lot 130; and time slots that require bumping ("canceling") appointments booked for other lots 130. Several of these searches may return the same time slot but a time slot should only appear once in the bid list returned to the lot 130. At least one bid 760 is always returned in this particular embodiment, and the minimum number of returned bids is determined by a configurable property value.

The LSA 705 selects one bid 760 from among all the bids 760 of all the MSAs 710. The LSA 705 then awards the contract 765 to the MSA 710 submitting the selected bid 760. The MSA 710 checks its machine calendar 770, determines that the bid is still available and, if so, awards the contract 740 to the resource 140 that submitted the selected bid 735. The RSA 715 checks its resource calendar 745, sees that the bid is still available, and schedules the appointment 775a on its own resource calendar 745.

The RSA 715 then confirms the contract with a "confirm bid" message 755, and the MSA 710 schedules an appointment 775b on its machine calendar 770, with a reference to the RSA 715 that provided the "resource" bid 735. The MSA 710 then sends a "confirmed bid" message 780 to the LSA 705. The LSA 705 then schedules the corresponding appointment 775c on its own lot calendar 785. When the time arrives for the appointments 775a, 775b, 775c to execute, the scheduling agents 705, 710, and 715 pass control to their respective processing agents (not shown).

Note that providing a particular process service may require no resources or more than one type of resource. The MSA 710 may therefore forego negotiations with the RSA 715 or may negotiate with several different types of RSAs 715. For example, lot processing may require not only a resource 140, but also an empty carrier (not shown) and a WFT (also not shown). Thus, the MSA 710 may repeat the negotiation described relative to the RSA 715 and resource 140 several times.

Note also that, by the time the LSA 705 seeks confirmation of the bid 760, the machine calendar 770 of the process tool 115 may have changed and the time slot may not be available or the bid cost may have changed. The MSA 710 will confirm the bid 760 only if the time slot is available and the bid cost does not increase more than a configurable percentage of the original bid cost. Otherwise, the MSA 715 replies to the LSA 705 indicating the bid 760 is not confirmed.

If the process tool 115 does not confirm the selected bid 760, then the LSA 705 determines whether to start the bidding over or to select the next best bid. The LSA 705 compares the number of remaining bids 760 with a configurable "rebid threshold." If the number of remaining bids 760 is greater than the rebid threshold, the lot 130 returns to the bid selection process described above and selects the next best bid 760. After selecting the next best bid 760, the LSA 705 calculates an objective function F (discussed further below) for the new bid 760. If the value of F has not increased by more than a configurable percentage of the objective function F for the best bid 760, the LSA 705 attempts to confirm the next bid 760. Otherwise, if the remaining bids are less than a rebid threshold or the objective function F for the next bid 760 has increased too much, the LSA 705 begins the entire process over again by requesting bids from all capable process tools 115.

Note that the scheduling process described above relative to FIG. 7 includes constraining (at 209, FIG. 2) the autonomous scheduling to lessen queue time violations in the process flow 100. As was mentioned above, an appointment is not negotiated and booked unless it complies with a maximum queue time for the process operation being scheduled. The information regarding maximum queue times is kept in an electronic data store in, e.g., the data storage 310, shown in FIG. 3. The illustrated embodiment defines the maximum queue time at the time the bidding process begins by including the maximum queue time information in the bid request 725 as will be discussed further below. However, alternative embodiments may, for instance, define the maximum queues time at other times, such as during formulation of the bids.

Note further that the maximum queue time is defined relative to two scheduled process operations, an earlier process operation and a later process operation. Only one of the two process operations will be the subject of any given negotiation. Thus, the other process operation defining the queue time will already have been scheduled. As was discussed relative to FIG. 6, two process operations may be negotiated out of the order in which they will be executed. Thus, the negotiation may be for either the earlier or the later of the process operations that define the queue time. In situations where a process appointment for the later process operation is negotiated and booked prior to an appointment for the earlier appointment, max move and feeder appointments may be used to fill in the calendar and provide a scheduled appointment relative to which the maximum queue times may be defined for scheduling in compliance therewith.

Returning to FIG. 7, selected portions of the "contract net negotiation protocol" approach with respect to the bid request and the bids themselves discussed briefly above shall now be discussed in greater detail. As mentioned, the bidding process begins when the LSA 705 requests the bids 760 from all capable process tools 115. As will be appreciated by those in the art having the benefit of this disclosure, capability will primarily be predicated on whether a process tool 115 can perform the process operation the lot 130 seeks to enter.

When a LSA 705 requests a bid 760 from the capable process tools 115, it includes the following information in the bid request 725:

the transport start time ("TST"), or earliest time to begin transport from the last (previous) process tool, or current location;

the process-operation ("PO") and process-step ("PS") to be scheduled;

the consumer's latest delivery time ("$LDT_C$"), or the latest completion time for the process operation that is acceptable to the lot 130;

the identity of the last location, or "source" location, i.e., the location from which the consumer will be transported to the process tool 115;

the next appointment location;

the previous appointment location;

the previous appointment end time;

the target appointment time;

the maximum queue time ("MQT"); and the identity of the lot 130 requesting the bid.

The "target" appointment is the appointment being scheduled, and the "next" and "previous" appointments are defined relative to the target appointment. In some embodiments, consumer agents provide a budget calculator to the provider agent. The budget calculator permits the provider agent to determine the consumer's priority relative to other appointments previously booked on the provider's calendar.

The MSAs 710 for the capable process tools 115 formulate bids 760. As mentioned above, the MSA 710 maintains a machine calendar 770 to track its appointments. When the request bid message 725 is received, the MSA 710 searches the machine calendar 770 for an opening in which the lot 130 can be scheduled for an appointment.

The MSAs 710 for the capable process tools 115 next submit the bids 760 to the LSA 705. The bids 760 contain "bid information" that varies by implementation. The bid information might include, for instance, only the identification of the process tool 115 submitting the bid 760 and the processing time interval. In the illustrated embodiment, the bid information includes at least the:

TS≡Appointment Start Time, as defined above;

TE≡Appointment End Time, as defined above;

EST≡Earliest Start Time for processing, i.e., the earliest time at which the lot 130 can commit to be ready for processing at the process tool 115; and $LDT_P$≡Latest Delivery Time, as defined above, which may be later or otherwise different than $LDT_C$ requested by lot.

However, additional information may also be included, such as the bid cost.

Loading constraints are applied to yield a more accurate determination when the lot 130 is to be loaded onto the process tool 115 before processing starts. Among these constraints are:

LST=carrier-in start time;
RLT=remaining carrier-in; and
ELT=earliest carrier-in time, which is essentially the basic determination set forth above (i.e., the EST).

These loading constraints are attributes of lot appointments, lot processing appointments, and resource charge lot appointments. The following unloading constraints are attributes of PM, Qual, downtime, machine batch and resource charge batch appointments on the machine/resource calendars 770, 745:

UST=unloading start time; and
RUT=remaining unloading time.

If these unloading constraints are set, the respective appointment will be constrained so its shifting ability (discussed more fully below) requires that it maintain the required time interval between itself and the previous batch processing appointment so that lots 130 involved in a preceding appointment can be unloaded.

The EST of each batch participant takes into account that the individual lot requires loading time but since the load size is less than the batch size, all of the lots 130 cannot be loaded in parallel. These difficulties can be resolved, however, by considering the order in which the participants will be loaded. To this end, each lot processing appointment and resource charge lot appointment includes an attribute "transferSequence" identifying where in the loading order the respective lot 130 falls, e.g., 1, 2, 7 indicating first, second, third. A value of "0" indicates that loading is not needed. However, other suitable algorithms may be employed in alternative embodiments.

Still referring to FIG. 7, costs and budgets used in the formulation and selection of bids will now be discussed. A combination of budgets, costs, and ratios are used to implement a floating market model approach. The combination is structured to encourage "desirable" behavior, e.g., meeting due dates, effective utilization of machines, etc. A "budget" is assigned to the consumers, e.g., the lots 130, that a software agent 365 uses to procure the process services at the costs associated therewith. Similarly, the process tool 115, charges consumers for the processing services it provides, e.g., processing time, which becomes a "cost." The amount of the budget the lot 130 is willing to pay depends on how badly it needs to stay on schedule and the amount charged by the process tool 115 depends on how badly it needs to fill its schedule. The lot 130 acquires services more or less aggressively depending on selected factors, such as priority or lateness. Process tools 115 provide such services more or less aggressively depending on a number of factors, such as the level of congestion in their calendars.

Each MSA 710 for each capable process tool 115 actually prepares multiple bids 760 predicated on different appointment start times. Each bid 760 includes a different "cost." In the illustrated embodiment, each of the scheduling agents 705 and 718, representing "end" consumers, has associated with it a budget calculator tool (not shown) to facilitate rapid budget determinations. Each provider scheduling agent 710, 715 calls the consumer's respective budget calculator tool to determine the relative priority of a consumer in formulating the multiple bids 760 being prepared.

More particularly, the scheduling agents 710 and 715, representing providers, each has an associated "cost calculators" (not shown) also employed in formulating bids to determine costs for available time slots. The cost determinations reflect the desire of the MSA 710 or RSA 715 to achieve its goals for its process tool 115 or resource 140. For instance, if the process tool 115 is relatively idle, the cost may be relatively low in an attempt to reduce machine idle time. Conversely, if the process tool 115 is relatively busy, the cost may be relatively high—thereby reflecting a lesser need to increase machine utilization. The MSA 710, representing an "intermediate" consumer, passes the budget calculator tool of the provider agent (e.g., the LSA 705, PMSA 718) with which it is negotiating to the provider agent with which it is also negotiating (e.g., the RSA 715). Thus, providers can readily determine the available budget for end consumers and costs for offering their processing services to the end consumers.

Typically, the budget used by the consumer to acquire process services is assigned by the consumer software agent, e.g., the LSA 705. The budget can be structured to affect the operation of the process flow 100. For instance, consumers having a higher priority for completing the process flow 100 may be afforded greater budgets to increase their chances of successfully acquiring the desired process service. In one particular embodiment, the consumer is provided a composite budget for consisting of the sum of three components: "regular budget", "reserve budget" and "savings account".

As mentioned above, each bid 760 includes a cost for the consumer to acquire the process service from the provider. The provider attempts to maximize its "profits" by adjusting the prices it offers in bids. The cost is predicated on a given appointment time and commitment window. The consumer, through its software scheduling agent, selects a submitted bid in light of the consumer's budget and priority and the provider's cost and bid end time. The selection may be as simple as a simple comparison of costs and the budget. However, because many factors can enter into the formulation of the various bids, as well as the strategies employed by the consumer 315, a more complex selection system may be more desirable in some implementations. For instance, a particular consumer might accept a more expensive bid to ensure a more timely delivery of the purchased resource.

Each lot 130 is assigned a priority that, in the illustrated embodiment, affects the budget of the lot 130. Typically, this is done manually although the priority may be set autonomously in accordance with preprogrammed parameters and classifications. In one particular implementation, five priorities are used: "normal," "critical," "hot," "rocket," and "platinum." The higher the priority, the higher the budget.

The budget for the lot 130 is determined by a budget tool (not shown), or "Budget Calculator" function, that can be called by a machine scheduling agent 710 and provided by the lot scheduling agent 705. The budget tool receives as inputs an identification of the process operation, process step and the date/time at which it is to be evaluated as inputs. From these inputs, the budget tool determines a budget for the lot 130 to complete the process step at a future time. The budget tool provides the estimated regular budget, reserve budget, and savings account for the lot 130 to complete the processing step at the future time.

Note that the budget provided to a given consumer may be managed to help constrain (at 209, FIG. 2) the autonomous scheduling to lessen queue time violations in the process flow 700. For instance, when the consumer begins processing the earlier process operation of a queue time constraint. The increase can be viewed as a "reward" for a making good scheduling decision. This variation is useful in conjunction with the variations in which the bid selection process is relatively more sophisticated than simply selecting the lowest submitted bid 760. One such variation is set forth below in which the LSA 705 considers the risk of a queue time violation in selecting one of several submitted bids 760. In the illustrated embodiment, the consumer's budget is increased inversely proportionally to the difference between the maximum queue time and the scheduled queue time.

Still referring to FIG. 7, the bid selection process of the illustrated will now be discussed. The MSA 710 packages the bid information and submits the bid(s) 760 to the LSA 705. In the illustrated embodiment, the MSA 710 actually returns several alternative bids 760, each with a different start time, in the form of a bid list. After receiving all bids 760 from all MSAs 710 for the capable process tools 115, the LSA 705 evaluates the bids 760 and selects one bid 760 from among those submitted.

In general, the LSA 705 will seek to conserve its budget and acquire the desired process services for the least cost. The risk of a queue time violation may nevertheless, in some circumstances, make the lowest bid 760 undesirable. For instance, assume a high priority lot 130 receives two bids 760. Both bids 760 comply with the maximum queue time, but the low bid 760 carries a much higher risk of a queue time violation. For example, the low bid 760 might increase the congestion of the involved calendars 785, 775 such that there is no flexibility to adapt to unforeseen contingencies affecting the ability of the lot 130 or the process tool 115 to meet the schedule. The higher bid 760 might only be slightly higher, but carry a much a lower risk of a queue time violation. The rework, if necessary, might put the high priority lot 130 unacceptably behind schedule.

Thus, the LSA 705 will typically weigh the difference in costs, the difference in the violation risks, and, perhaps, other factors such as the degree to which rework would put the lot 130 behind schedule. The LSA 705 may select a bid 760 that is not the lowest to avoid an unacceptably high risk of queue time violation. To determine the desirability of a given bid, the illustrated embodiment employs an objective function of the proposed start time, cost, risk, and queue time violation. Alternative embodiments may omit some of these factors or employ other in addition to, or in lieu of, those listed. How the considered factors are weighted in any give embodiment will be implementation specific.

Furthermore, as was noted above, the invention admits wide variation in the manner in which the autonomous scheduling is constrained (at 209, FIG. 2) to lessen queue time violations in the process flow 700. Some embodiments may employ calendaring techniques to facilitate the scheduling process that provide opportunities for constraining the scheduling process. For instance, booked appointments may be subject to modification to accommodate the scheduling of new appointments or events occurring in the process flow 700. Booked appointments may be shifted, bumped, shrunken, expanded, aborted, canceled, and re-scheduled, for instance. These modifications may be initiated by the consumers, providers, or secondary resources, depending on the situation. In the alternative embodiments in which these calendaring techniques are employed, maximum queue times are observed in order to lessen queue time violations.

For instance, booked appointments may be shifted. As mentioned above, most appointments have a commitment window. Appointments may be viewed as "beads on a string." Existing appointments are permitted to slide backward or forward within their respective commitment windows as necessary to provide a calendar with flexibility that in turn permits the scheduling agent to create a more efficient schedule and react to unexpected events. In the illustrated embodiment, to simplify the logic, appointments are not permitted to shift past the next appointment in either direction.

Figure 8:
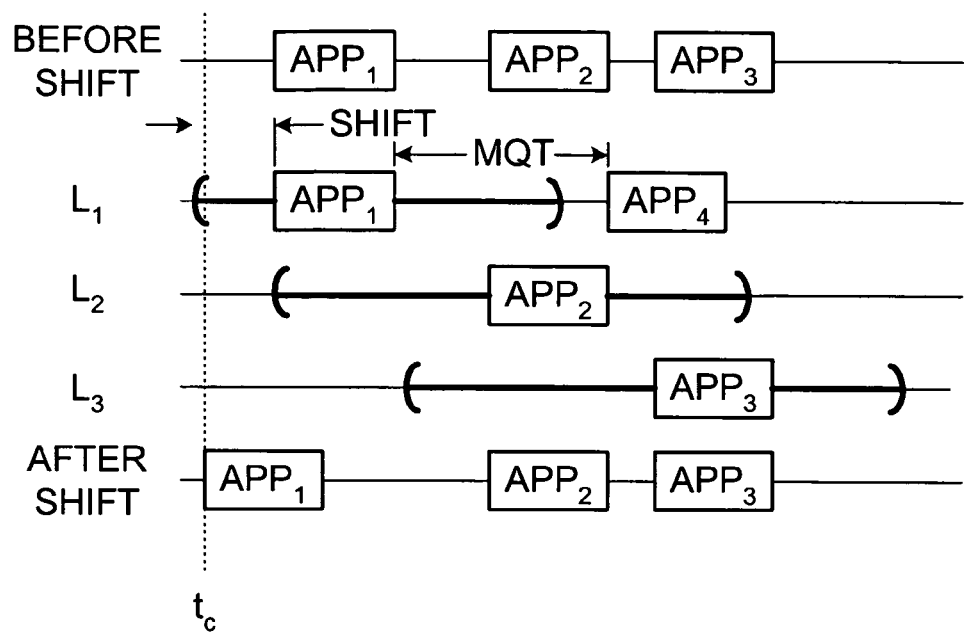
FIG. 8 and FIG. 9 conceptually illustrates the changing of booked appointments to take advantage of early start times.

One common reason for changing an appointment is to take advantage of "early starts." For example, if the MSA 710 in FIG. 7 encounters idle time while executing its schedule, the MSA 310 will attempt to shift the next appointment to an earlier start time and start it immediately. This instance is shown in FIG. 8, wherein the current time $t_c$ falls within the commitment window $CW_1$ for the next appointment $APP_1$. The next appointment $APP_1$ is then shifted left, or to an earlier time, so that its processing can begin immediately or, perhaps, earlier than its current start time. This helps avoid idle time of the process tool 115.

Figure 9:
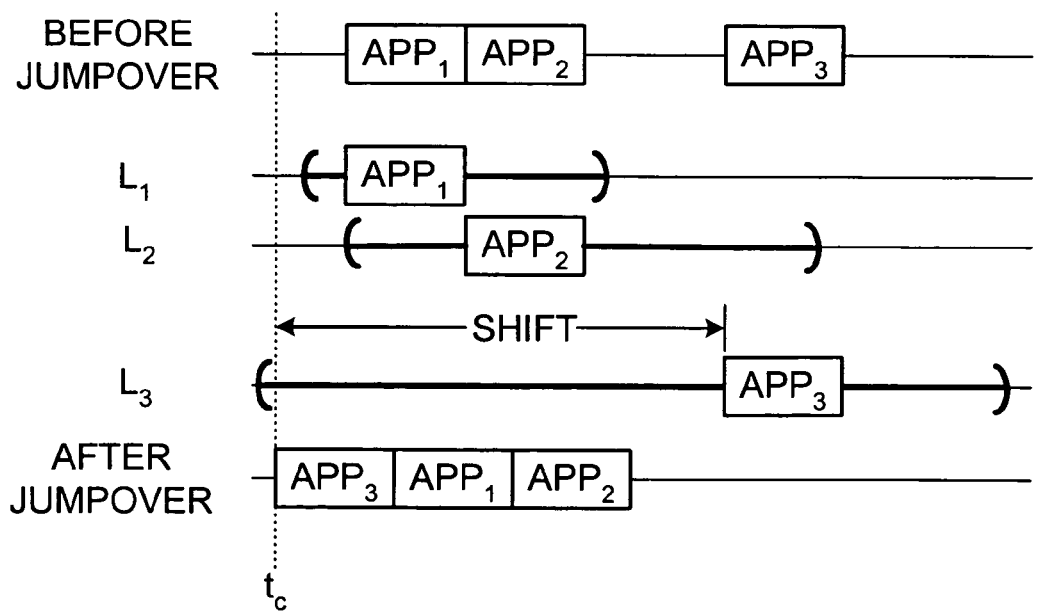

If the next booked appointment cannot be shifted to start at the current time, the MSA 710, in one of the alternative embodiments, will search for any other booked appointments that may have commitment windows starting at the current time or earlier. If one of these booked appointments can be moved to start immediately without causing cancellation of any other booked appointments, the booked appointment will be moved in a "jump over" fashion and other booked appointments will be shifted as required. This scenario is shown in FIG. 9, wherein the current time $t_c$ at which the provider is idle is outside the commitment window $CW_1$ of the next booked appointment $APP_1$, but falls within the commitment window $CW_3$ of the third booked appointment $APP_3$. Hence, the third appointment $APP_3$ jumps over to the left, or to an earlier time, and the appointments $APP_1$ and $APP_2$ are shifted right, or to a later time, respectively, in a "cascading" fashion.

Note that, if an appointment other than the next booked appointment is considered for moving to the start position, setups are considered. It may be necessary to add a setup before, and after, the booked appointment that is moved into the start position. This type of move should only be considered if the sum of the extra setup time is less than the idle time remaining until the earliest start time of the next appointment.

Figure 10:
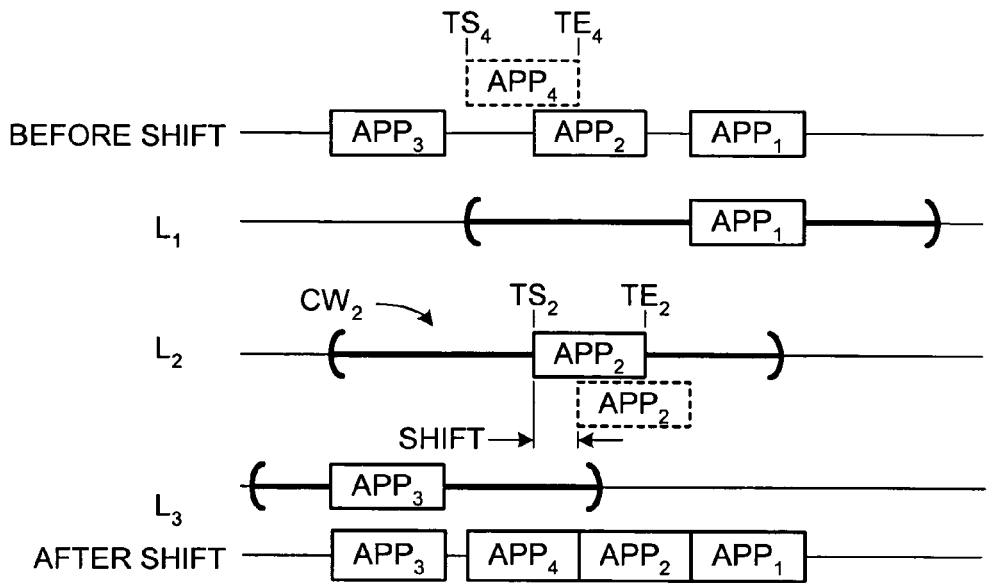
FIG. 10 conceptually illustrates how booked appointments may be shifted to accommodate the scheduling of a new appointment.

Another reason for modifying booked appointments is to open a slot for booking a new appointment. Consider, for example, the calendar conceptually illustrated in FIG. 10. The calendar has three appointments $APP_1$-$APP_3$ booked for three lots $L_1$-$L_3$, respectively. Note that each appointment $APP_1$-$APP_3$ is booked within a corresponding commitment window $CW_1$-$CW_3$, respectively. Assume that the provider for whom this schedule is maintained wishes to schedule the $APP_4$ for the lot $L_4$. The proposed appointment time slot $[TS_4, TE_4]$ conflicts with the scheduled appointment time $[TS_2, TE_2]$ for the booked appointment $APP_2$. However, the appointment $APP_2$ has ample room within its commitment window $CW_2$ within which to shift so that the appointment $APP_4$ can still be scheduled. In this particular example, the appointment $APP_2$ is shifted right, or later in time, within its commitment window $CW_2$ so that the appointment $APP_4$ may be scheduled and booked.

A variety of approaches may be taken to this kind of shifting, depending on the implementation. For instance:

a booked appointment may be considered for shifting to an earlier start time TS if it is preceded by a schedule gap or other appointments that can shift left and if shifting it to an earlier start time TS will allow the candidate appointment to be scheduled in the open time slot created by the shift;

booked appointment(s) may be considered for shifting to a later start time TS if there is no gap or an unusable gap (i.e., a candidate appointment will not fit) in the schedule immediately preceding the booked appointment(s) and the candidate appointment will eliminate the gap after shifting the booked appointment(s) to a later start time TS;

if a schedule gap precedes a setup, the setup may be shifted to an earlier start time to enable a new appointment (with the same setup) to be added immediately in front of a booked appointment that uses the same setup;

a setup can be eliminated if it is shifted to an earlier start time that immediately follows a booked appointment that requires the same setup; and a setup can be eliminated if it is shifted next to a setup of the same type.

However, not all embodiments will use any or all of these approaches.

Figure 11:
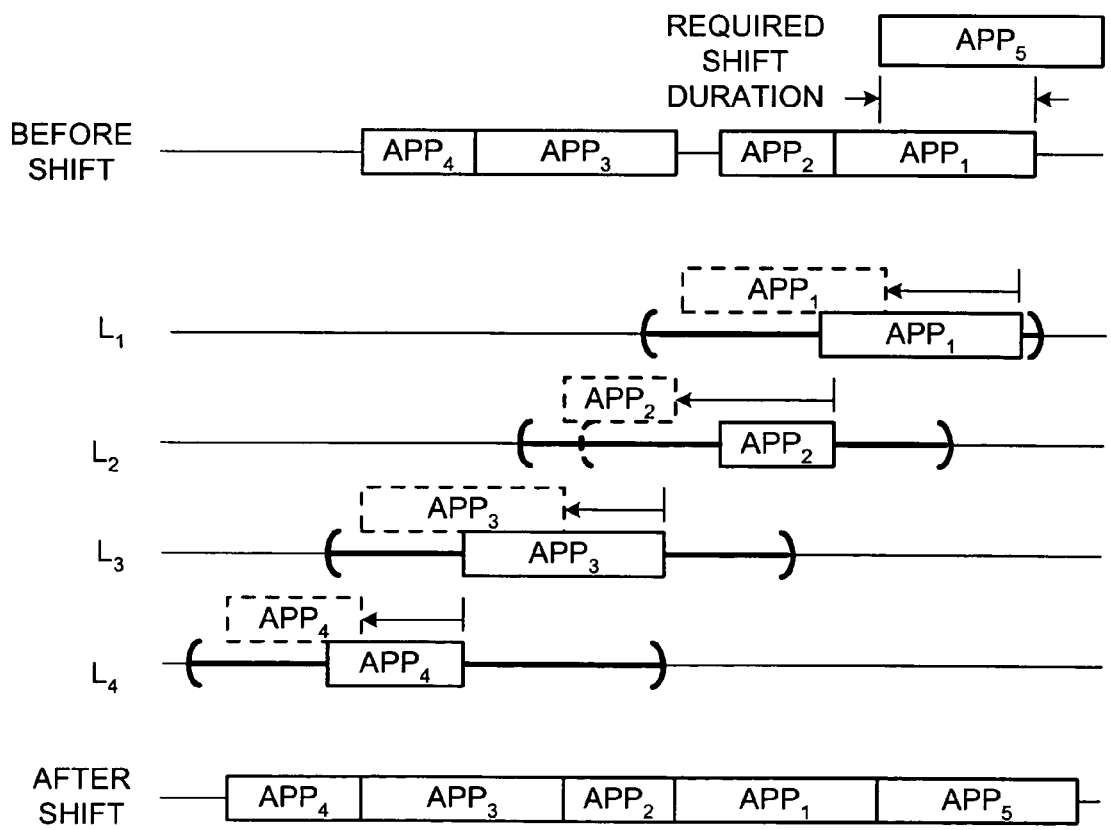
FIG. 11 conceptually illustrates a "cascade shift left" of booked appointments to accommodate the scheduling of a new appointment.

The shifting can also be more complex than just shifting a single booked appointment. One such situation is shown in FIG. 11, wherein several booked appointments are shifted in a "cascading" fashion to accommodate the scheduling of a new appointment $APP_5$. In FIG. 11, the new appointment $APP_5$ seeks to schedule at the time for which the appointment $APP_1$ is already booked. In this case, the commitment windows of all the booked appointments $APP_1$-$APP_4$ are ample enough to allow them to shift left (to an earlier time) in a "cascading" fashion to allocate the time slot for the new appointment $APP_5$. A more complicated and powerful shifting routine formed by combining a sequence of "cascading left shift" and "cascading right shift" moves can be used to open a time slot on the calendar for a new appointment.

Figure 12A:
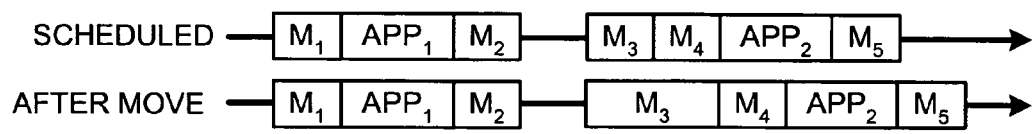
FIG. 12A and FIG. 12B conceptually illustrate two circumstances in which booked appointments are changed to accommodate unexpectedly long durations for preceding booked appointments.
Figure 12B:
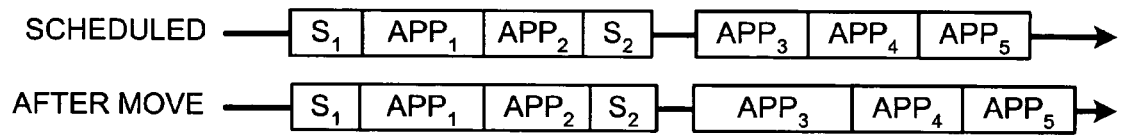

Appointments are also frequently changed when their duration, or the duration of an appointment preceding it, is shorter or longer than expected. FIG. 12A and FIG. 12B illustrate two such situations. In FIG. 12A, the move $M_3$ on the lot scheduling calendar was expanded because the transport was running longer than expected, and so the moves $M_4$, $M_5$ and the appointment $APP_2$ were shifted right to accommodate this longer duration. Note that shifting the processing appointment $APP_2$ will trigger an identical shift of the corresponding appointment (not shown) on the machine calendar unless it cannot be accommodated, in which case the MSA 710 may cancel the appointment instead of shifting it. In FIG. 12B, the appointment $APP_3$ took longer than was expected and was therefore expanded, so the appointments $APP_4$ and $APP_5$ were shifted right. The shifting of appointments $APP_4$ and $APP_5$ then triggers identical shifts of the corresponding appointments on the respective lot calendars. Note that in both FIG. 12A and FIG. 12B, the illustrated changes necessarily imply that, in both circumstances, the commitment windows for the changed appointments were wide enough to accommodate the changes. Otherwise, some appointments would have had to be canceled.

In the course of implementing these and any other calendaring techniques that manipulate booked appointments, maximum queue times are observed to lessen queue time violations. Consider the scenario illustrated in FIG. 8, in which the appointment $APP_1$ is shifted forward to take advantage of an earlier start. The shift will probably cause the lot $L_1$ to finish the appointment $APP_1$ early. As is shown in FIG. 8, the immediately succeeding appointment $APP_4$ for the lot $L_1$ has a mean queue time. If the appointment $APP_1$ is moved as proposed, a queue time violation will result. There are several approaches to this problem.

One approach is to permit modifications only where they will not result in queue time violations. The maximum queue time is an attribute of the appointment where applicable, and the information is therefore contained on the respective calendars 785, 770, 745. The scheduling agents 705, 710, 715 can therefore consider maximum queue times when evaluating a modification. If a proposed modification would result in a queue time violation, then the proposed modification is nixed. Otherwise, the proposed modification is implemented.

A second approach employs a locking mechanism. Generally speaking, there may be numerous occasions in which a modification is undesirable. For instance, when a lot 130 starts its final move from a source location to a machine port of the process tool 115, it is undesirable to have a new appointment jumping in front of it by canceling or shifting that appointment to the right, or later in time. To prevent this from occurring, when the LSA 705 asks the MSA 710 to reserve a machine port, the MSA 710 "locks" the lot processing appointment when the lot 130 starts its final move. This same locking mechanism can be used to lock the two appointments defining the actual queue time for the consumer to prevent either one from being modified.

Booked appointments may also be canceled, and may be canceled to prevent a queue time violation. As conditions change in the process flow 700, either the consumer or provider may no longer be able to meet one of the two appointments to prevent a queue time violation. If so, one or both of the appointments defining the queue time, depending on the circumstances, may be canceled. The cancellation permits the consumer to begin scheduling anew in an attempt to mitigate the effects of the prospective queue time violation.

In one particular embodiment, the cancellation may also effect a cancellation of other appointments. If a consumer requests that an appointment be canceled, typically, only that one particular appointment is canceled. Because of the appointment change notification mechanism (discussed below), both the consumer and the provider will remove the appointment from their respective calendars. However, in some embodiments, canceling one appointment may result in canceling all subsequent, previously booked appointments.

For example, if a LSA has multiple lot appointments booked in advance, and if one intermediate lot appointment is canceled, then all the subsequent appointments (move, lot appointment, carrier-in and carrier-out) may be canceled. If the last lot appointment is canceled, then all the move appointments leading to that process tool 115, and possible lot carrier-in appointment, lot carrier-out appointment, and the move appointment after that lot appointment may be canceled. The LSA will then start re-scheduling for canceled process operations. On the other hand, on a machine scheduling calendar, cancellation of a booked appointment due to bumping will not necessarily cause the cancellation of all appointments following the bumped appointment. A bumping bid may need to schedule a setup appointment following the newly booked appointment if insertion of the newly booked appointment removes or changes a setup required for subsequent appointments.

Note that, as booked appointments are shifted, shrunk, expanded, canceled, and rescheduled, the changes can ripple through the process flow and, in particular, the calendars. Changes are instituted by a single software agent 365, but each changed appointment may have corresponding appointments booked on multiple calendars. The changes are consequently communicated to the other software agents so they can update their respective calendars as was discussed immediately above. However, when the corresponding appointments on the other calendars are changed, the notification is suppressed so that it does not notify the agent that initiated the change. Otherwise, an infinite loop of change notifications will be formed between two scheduling agents.

To avoid this kind of undesirable change notification propagation, in the illustrated embodiment, a change event registration scheme is used. More specifically, when a MSA receives a change on a lot appointment, the change event is registered into a list (not shown) for the machine scheduling calendar. Later, when the MSA is ready to send a change notification about the corresponding lot processing appointment on its calendar, the MSA will first check the list of all the registered change events. In this case, a matched event will be found, and the MSA will interpret the event as a reactive change event coming from the LSA. Thus, no further action is required on the machine side, and the MSA will just remove the matched change event from the list. However, non-agent appointment listeners such as the calendar loggers and calendar GUI are always notified of relevant appointment changes. This occurs regardless of whether the change is being initiated or is a reactive change because these types of applications typically listen to only one calendar.

As alluded to above, the illustrated embodiment employs an appointment change notification mechanism to communicate the occurrence of events in the process flow 100 and to keep corresponding appointments synchronized. The illustrated embodiment uses an appointment change notification mechanism illustrated more fully in FIG. 13. It is through this notification mechanism that the illustrated embodiment detects that an event has occurred in the process flow. The events communicated by this mechanism include triggering events (i.e., appointment state changes, in the illustrated embodiment). However, the appointment change notification mechanism may also be used to communicate events that are not triggering events. Such is the case in the illustrated embodiment.

Figure 13:
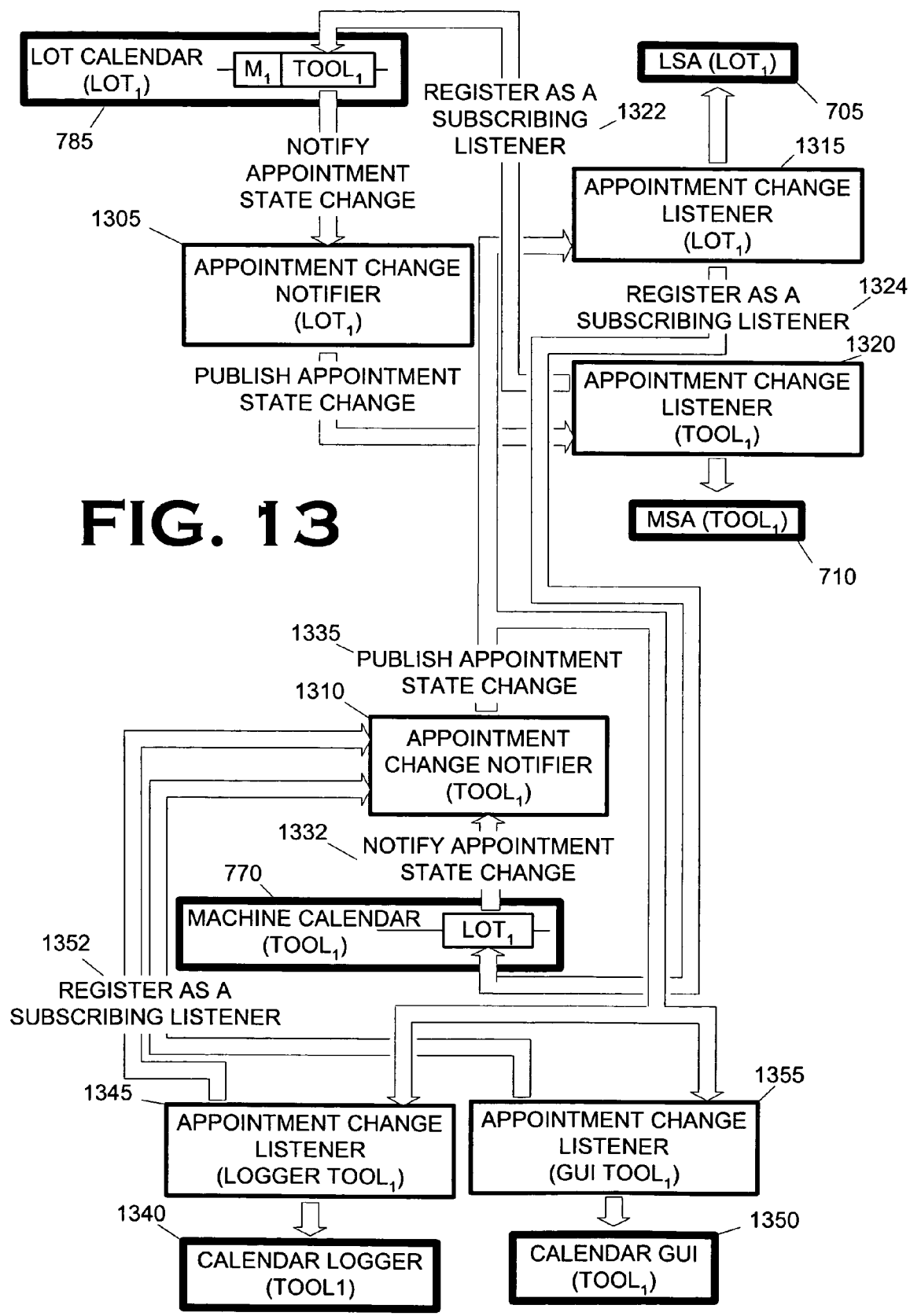
FIG. 13 illustrates the notification mechanism employed in one particular embodiment to keep corresponding appointments on different calendars synchronized.

FIG. 13 illustrates the mechanism with respect to the LSA 705, lot calendar 785, MSA 710 and the machine calendar 770 of FIG. 7. Note, however, that the mechanism illustrated in FIG. 13 can be extended to any set of calendars and appointments in the process flow 100. Each calendar 785, 770 has a change notifier 1305, 1310, respectively that publishes changes to its appointments. Each of the corresponding appointments, either on the provider side or on the consumer side, is created with a reference to the respective change notifier 1305, 1310 for the respective calendar 785, 770 on which it is booked. Each of the scheduling agents 705, 710 maintaining the corresponding appointment has a "change listener" 1315, 1320, respectively. The change listeners 1315, 1320 subscribe to appointment changes that are published by the change notifiers 1305, 1310 that belong to the corresponding appointment on the other side. In FIG. 13, the appointment change listener 1315, 1320 register (at 1322, 1324, respectively) with the lot appointment $TOOL_1$ and the lot processing appointment $LOT_1$, respectively, as subscribing listeners.

When the change listener 1315, 1320 receives a change event about the corresponding appointment on the other side, it will trigger its respective scheduling agent 705, 710 to find the corresponding appointment, and make appropriate adjustment to that appointment so that the appointment(s) on the provider side and consumer side will always keep in synch, if possible. However, the scheduling agent 705, 710 receiving the appointment change may need to react differently. In that case, it makes a different change to its appointment(s) and publishes that change to the listeners 1315, 1320.

More particularly, when a provider (e.g., the process tool 115, in FIG. 7) changes a booked appointment (e.g., the appointment 775b on the machine calendar 770, in FIG. 7) through its scheduling agent (e.g., the MSA 710), notifies (at 1332, in FIG. 13) the respective appointment change notifier (e.g., the change notifier 1310). The change notifier of the provider publishes an "appointment change event" (at 1335 in FIG. 13) to its subscribing listeners (including the one from the consumer). When the consumer change listener (e.g., the change listener 1315) receives the appointment change event, it triggers the consumer scheduling agent (e.g., the LSA 705) to make the same change to the corresponding appointment (e.g., the lot appointment 775c) on its respective calendar (e.g., the lot calendar 785). The appointment change event in the illustrated embodiment includes the information about the changed appointment (e.g., a copy of the appointment), the old start time of the appointment, and the name of a specific method associated with the type of appointment change. The consumer change listener calls the matching method name in its scheduling agent, which will use this information to find the corresponding appointment, and make appropriate changes on the consumer side.

A slightly different change notification mechanism is used by calendar loggers and calendar "graphic user interface" ("GUI") display tools. In the illustrated embodiment, each calendar (e.g., the machine calendar 770) has a respective calendar logger (e.g., the calendar logger 1340) that logs all the changes occurring to the appointments on the calendar. Each calendar logger has an appointment change listener (e.g., the change listener 1345) subscribing to the changes on all the appointments (not just one) on the corresponding calendar. The calendar logger and calendar GUI (e.g., the calendar GUI 1350) register (e.g., at 1352) their listeners directly with the change notifier of the calendar they are listening to, rather than subscribing directly to each individual appointment. This allows the calendar logger and calendar GUI to listen to changes to every appointment on the calendar, including the booking of new appointments.

When one appointment or a set of appointments on the calendar is changed, the change listener will be notified as described above. The change listener will then trigger the calendar logger to log the corresponding change event(s) and dump the calendar. The entire history of a calendar can be recorded in a calendar log file in this manner. WFTs view a calendar using a set of GUI display tools. In this case, every calendar displayed on a computer screen has its own appointment change listener. As in the case of the calendar logger, this change listener is also subscribing to the changes of all the appointments on the displayed calendar. When something changes on the calendar, this change listener will be notified by the change notifier of the appointments, and this in turn will automatically trigger the refresh of the displayed calendar.

Note that, as conditions in the process flow 100 change, booked appointments may be shifted, shrunk, expanded, canceled, and/or rescheduled. These changes can ripple through the process flow 100 and, in particular, the calendars. Changes are instituted by a single software agent, but each changed appointment may have corresponding appointments booked on multiple calendars. The changes are consequently communicated to the other software agents so they can update their respective calendars as was discussed immediately above and illustrated in FIG. 13. However, when the corresponding appointments on the other calendars are changed, the notification is suppressed so that it does not notify the agent that initiated the change. Otherwise, an infinite loop of change notifications will be formed between two scheduling agents.

To avoid the kind of undesirable change notification propagation represented by the infinite loop of change notifications, the illustrated embodiment uses a change event registration scheme. More specifically, when a MSA 710 receives a change on a lot appointment, the change event is registered into a list (not shown) for the machine scheduling calendar 770. Later, when the MSA 710 is ready to send a change notification about the corresponding lot processing appointment on its calendar 770, the MSA 710 will first check the list of all the registered change events. In this case, a matched event will be found, and the MSA 710 will interpret the event as a reactive change event coming from the LSA 705. Thus, no further action is required on the machine side, and the MSA 710 will just remove the matched change event from the list. However, non-agent appointment listeners such as the calendar loggers 1340 and calendar GUI 1350 are always notified of relevant appointment changes. This occurs regardless of whether the change is being initiated or is a reactive change because these types of applications typically listen to only one calendar.

The invention admits wide variation. For example, the automated semiconductor fabrication facility of FIG. 10 may be implemented in many variations. For instance, implementations may vary the degree of automation. Thus, in some alternative embodiments, the physical factory 1000 may be implemented without the AMHS 1060 or with a less than full AMHS 1060. The AEMS 1020 may schedule/process all activity on all machines, all activity on a subset of machines, or most activity on a subset (or all) of the machines. Implementations may also vary scheduling and processing options. For instance, MSAs may be employed without MPAs, and the level of human interaction may be more or less, depending on design constraints.

This concludes the detailed description. The particular embodiments disclosed above are is illustrative only, as the invention may be modified and practiced in different but equivalent manners apparent to those skilled in the art having the benefit of the teachings herein. Note that further variations not discussed may be employed in still other embodiments. For instance, if a machine has idle time to sell it may want to advertise, or, individual machines may be assigned sales quotas as a goal to meet in utilization. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for use in an automated manufacturing environment, comprising:
   autonomously scheduling a consumer manufacturing domain entity for the consumption of services provided by a plurality of provider manufacturing domain entities in an automated process flow; and
   constraining the autonomous scheduling to lessen queue time violations in the process flow, including:
      negotiating for appointments that will comply with maximum queue times; and
      considering the risk of queue time violations when selecting bids.

2. The method of claim 1, wherein autonomously scheduling includes:
   negotiating among a plurality of software implemented agents, each representing a respective one of the consumer and provider manufacturing entities; and
   booking a plurality of negotiated appointments for the consumption of services.

3. The method of claim 2, wherein autonomously scheduling includes scheduling through a contract net negotiation protocol.

4. The method of claim 2, wherein booking the negotiated appointments includes booking the negotiated appointments on a plurality of calendars, each calendar being associated with a respective consumer and provider manufacturing domain entities.

5. The method of claim 2, wherein booking the negotiated appointments includes booking negotiated appointments that will comply with maximum queue times.

6. The method of claim 1, wherein negotiating for appointments that will comply with maximum queue times includes defining a maximum queue time when requesting bids for a later process operation of a queue time constraint when a previous operation of the queue time constraint is already booked.

7. The method of claim 1, wherein negotiating for appointments that will comply with maximum queue times includes defining a maximum queue time when requesting bids for a previous process operation of a queue time constraint when a later process operation of the queue time constraint is already booked.

8. The method of claim 1, wherein negotiating for appointments that will comply with maximum queue times includes decreasing a commitment window end time when requesting bids for a later process operation of a queue time constraint when a previous process operation of the queue time constraint is already booked.

9. The method of claim 1, wherein constraining the autonomous scheduling includes scheduling the consumption of services to comply with maximum queue times.

10. The method of claim 1, wherein constraining the autonomous scheduling to lessen queue time violations includes scheduling appointments for consumption that will comply with maximum queue times.

11. The method of claim 10, wherein scheduling the consumption of services to comply with maximum queue times includes limiting the shifting of appointments to prevent violation of maximum queue times.

12. The method of claim 10, wherein scheduling the consumption of services to comply with maximum queue times includes locking down a scheduled appointment to prevent a queue time violation.

13. The method of claim 10, wherein scheduling the consumption of services to comply with maximum queue times includes canceling an appointment that will result in a violation of a queue time.

14. The method of claim 1, wherein constraining the autonomous scheduling includes increasing a budget of a consumer when the consumer begins processing at the previous process operation of a queue time constraint.

15. The method of claim 14, wherein increasing the budget of a consumer when the consumer begins processing at the previous process operation of a queue time constraint includes increasing the budget inversely proportionally to the difference between the maximum queue time and the scheduled queue time.

16. The method of claim 1, further comprising executing the scheduled consumption.

17. The method of claim 1, further comprising rework scheduling upon an expected violation of a maximum queue time or an actual violation of a maximum queue time.

18. An apparatus for use in an automated manufacturing environment, the apparatus comprising:
   means for autonomously scheduling a consumer manufacturing domain entity for the consumption of services provided by a plurality of provider manufacturing domain entities in an automated process flow; and
   means for constraining the autonomous scheduling to lessen queue time violations in the process flow, including:

means for negotiating for appointments that will comply with maximum queue times; and means for considering the risk of queue time violations when selecting bids.

19. The apparatus of claim 18, wherein the autonomous scheduling means includes:

means for negotiating among a plurality of software implemented agents, each representing a respective one of the consumer and provider manufacturing entities; and means for booking a plurality of negotiated appointments for the consumption of services.

20. The apparatus of claim 18, wherein constraining the autonomous scheduling includes means for increasing a budget of a consumer when the consumer begins processing at the previous process operation of a queue time constraint.

21. The apparatus of claim 18, further comprising means for executing the scheduled consumption.

22. The apparatus of claim 18, further comprising means for rework scheduling upon an expected violation of a maximum queue time or an actual violation of a maximum queue time.

23. A computing apparatus, comprising:
a computing device;
a bus system;
a storage communicating with the computing device over the bus system; and
a plurality of software-implemented agents residing on the storage that, when invoked by the computing device, performs a method for use in an automated manufacturing environment, the method comprising:
autonomously scheduling a consumer manufacturing domain entity for the consumption of services provided by a plurality of provider manufacturing domain entities in an automated process flow; and
constraining the autonomous scheduling to lessen queue time violations in the process flow, including:
negotiating for appointments that will comply with maximum queue times; and
considering the risk of queue time violations when selecting bids.

24. The computing apparatus of claim 23, wherein autonomously scheduling in the method includes:
negotiating among a plurality of software implemented agents, each representing a respective one of the consumer and provider manufacturing entities; and
booking a plurality of negotiated appointments for the consumption of services.

25. The computing apparatus of claim 23, wherein constraining the autonomous scheduling to lessen queue time violations includes scheduling appointments for consumption that will comply with maximum queue times.

26. The computing apparatus of claim 23, wherein constraining the autonomous scheduling in the method includes increasing a budget of a consumer when the consumer begins processing at the previous process operation of a queue time constraint.

27. The computing apparatus of claim 23, wherein the method further comprises executing the scheduled consumption.

28. The computing apparatus of claim 23, wherein the method further comprises rework scheduling upon an expected violation of a maximum queue time or an actual violation of a maximum queue time.

29. A program storage medium encoded with instructions that, when executed by a computing device, perform a method for use in an automated manufacturing environment, the method comprising:
autonomously scheduling a consumer manufacturing domain entity for the consumption of services provided by a plurality of provider manufacturing domain entities in an automated process flow; and
constraining the autonomous scheduling to lessen queue time violations in the process flow, including:
negotiating for appointments that will comply with maximum queue times; and
considering the risk of queue time violations when selecting bids.

30. The program storage medium of claim 29, wherein autonomously scheduling in the encoded method includes:
negotiating among a plurality of software implemented agents, each representing a respective one of the consumer and provider manufacturing entities; and
booking a plurality of negotiated appointments for the consumption of services.

31. The program storage medium of claim 29, wherein constraining the autonomous scheduling to lessen queue time violations in the encoded method includes scheduling appointments for consumption that will comply with maximum queue times.

32. The program storage medium of claim 29, wherein constraining the autonomous scheduling in the encoded method includes increasing a budget of a consumer when the consumer begins processing at the previous process operation of a queue time constraint.

33. The program storage medium of claim 29, wherein the encoded method further comprises executing the scheduled consumption.

34. The program storage medium of claim 29, wherein the encoded method further comprises rework scheduling upon an expected violation of a maximum queue time or an actual violation of a maximum queue time.

35. An automated processing environment, comprising:
a plurality of manufacturing domain entities including at least one consumer manufacturing domain entity and a provider manufacturing domain entity;
a plurality of software implemented agents representing the manufacturing domain entities for scheduling purposes and performing a method comprising:
autonomously scheduling the consumer manufacturing domain entity for the consumption of services provided by the provider manufacturing domain entity; and
constraining the autonomous scheduling to lessen queue time violations in the process flow, including:
negotiating for appointments that will comply with maximum queue times; and
considering the risk of queue time violations when selecting bids.

36. The automated processing environment of claim 35, wherein autonomously scheduling in the method includes:
negotiating among a plurality of software implemented agents, each representing a respective one of the consumer and provider manufacturing entities; and
booking a plurality of negotiated appointments for the consumption of services.

37. The automated processing environment of claim 35, wherein constraining the autonomous scheduling to lessen queue time violations in the method includes scheduling appointments for consumption that will comply with maximum queue times.

38. The automated processing environment of claim 35, wherein constraining the autonomous scheduling in the method includes increasing a budget of a consumer when the consumer begins processing at the previous process operation of a queue time constraint.

39. The automated processing environment of claim 35, wherein the method further comprises executing the scheduled consumption.

40. The automated processing environment of claim 35, wherein the method further comprises rework scheduling upon an expected violation of a maximum queue time or an actual violation of a maximum queue time.

* * * * *